(12) United States Patent
Fukazawa et al.

(10) Patent No.: US 11,899,934 B2
(45) Date of Patent: Feb. 13, 2024

(54) COMPRESSION DEVICE, COMPRESSION AND DECOMPRESSION DEVICE, AND MEMORY SYSTEM

(71) Applicant: KIOXIA CORPORATION, Tokyo (JP)

(72) Inventors: Youhei Fukazawa, Kawasaki Kanagawa (JP); Sho Kodama, Kawasaki Kanagawa (JP); Keiri Nakanishi, Kawasaki Kanagawa (JP); Kohei Oikawa, Kawasaki Kanagawa (JP); Takashi Miura, Yokohama Kanagawa (JP); Daisuke Yashima, Tokyo (JP); Masato Sumiyoshi, Yokohama Kanagawa (JP); Zheye Wang, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 36 days.

(21) Appl. No.: 17/686,246

(22) Filed: Mar. 3, 2022

(65) Prior Publication Data
US 2022/0398019 A1  Dec. 15, 2022

(30) Foreign Application Priority Data
Jun. 10, 2021  (JP) .................................. 2021-097195

(51) Int. Cl.
*G06F 3/06* (2006.01)
(52) U.S. Cl.
CPC .......... *G06F 3/0608* (2013.01); *G06F 3/0655* (2013.01); *G06F 3/0679* (2013.01)
(58) Field of Classification Search
CPC .... G06F 3/0608; G06F 3/0655; G06F 3/0638; G06F 3/0679; Y02D 10/00

USPC .......................................................... 711/154
See application file for complete search history.

(56) References Cited

U.S. PATENT DOCUMENTS

| | | | |
|---|---|---|---|
| 8,260,989 B2 | 9/2012 | Etkin et al. | |
| 8,904,103 B2 | 12/2014 | Taniyama | |
| 2013/0088373 A1 | 4/2013 | Takano | |
| 2016/0078045 A1* | 3/2016 | Ebsen | G06F 16/185 |
| | | | 707/693 |
| 2019/0034334 A1* | 1/2019 | Arelakis | H03M 7/40 |
| 2019/0079799 A1 | 3/2019 | Kumar et al. | |
| 2021/0135685 A1* | 5/2021 | Kumar | G06F 16/2255 |

(Continued)

FOREIGN PATENT DOCUMENTS

| JP | 2013-085071 A | 5/2013 |
|---|---|---|
| JP | 5712609 B2 | 5/2015 |

*Primary Examiner* — Hashem Farrokh
(74) *Attorney, Agent, or Firm* — Kim & Stewart LLP

(57) ABSTRACT

A compression device includes an analyzer circuit, a control circuit, a compressor circuit, and a selector circuit. The analyzer circuit is configured to analyze first data that is input thereto and generate one or more parameter values regarding data compression and/or decompression. The control circuit is configured to generate at least one compression mode information indicating whether or not compression is to be performed, based on the one or more parameter values. The compressor circuit is configured to compress the first data into second data according to the compression mode information. The selector circuit is configured to output the first data if not compressed or the second data if the first data is compressed, together with the compression mode information.

19 Claims, 9 Drawing Sheets

(56) References Cited

U.S. PATENT DOCUMENTS

| | | | | |
|---|---|---|---|---|
| 2021/0200437 A1* | 7/2021 | Li | ............................ | G06N 3/08 |
| 2021/0211733 A1* | 7/2021 | Aksu | ....................... | H04N 19/46 |
| 2022/0376703 A1* | 11/2022 | Pope | .................... | H03M 7/6011 |

* cited by examiner

COMPRESSION DEVICE, COMPRESSION AND DECOMPRESSION DEVICE, AND MEMORY SYSTEM

CROSS-REFERENCE TO RELATED APPLICATION

This application is based upon and claims the benefit of priority from Japanese Patent Application No. 2021-097195, filed Jun. 10, 2021, the entire contents of which are incorporated herein by reference.

FIELD

Embodiments described herein relate generally to a compression device, a compression and decompression device, and a memory system.

BACKGROUND

A data center or the like includes a nonvolatile memory in a memory system such as a hard disk drive (HDD) and a solid state drive (SSD) to store data. When it is necessary to store a large amount of data, the data may require a large space in the nonvolatile memory, and the cost for providing such a large space increases.

A memory system operates so as to reduce the amount of data written to a nonvolatile memory by lossless data compression. According to the data compression, a storage area of the nonvolatile memory can be effectively utilized (more data can be written) and the amount of physical writing to the nonvolatile memory and the amount of physical reading from the nonvolatile memory can be reduced. As a result, a writing speed and a reading speed can also be improved.

Recently, higher data compression performance is in demand, and compression algorithms to meet such a demand have been developed. However, these compression algorithms lead to an increase in the size of circuits that implement the compression algorithm and further an increase in power consumption on the data compression in accordance with the increase of the circuit size.

Also, the power consumption of compressing and decompressing data has become relatively large relative to the overall power consumption of a memory controller that controls the nonvolatile memory.

DETAILED DESCRIPTION

Embodiments provide a compression device, a compression and decompression device, and a memory system capable of reducing power consumption.

In general, according to an embodiment, a compression device includes an analyzer circuit, a control circuit, a compressor circuit, and a selector circuit. The analyzer circuit is configured to analyze first data that is input thereto and generate one or more parameter values regarding data compression and/or decompression. The control circuit is configured to generate at least one compression mode information indicating whether or not compression is to be performed, based on the one or more parameter values. The compressor circuit is configured to compress the first data into second data according to the compression mode information. The selector circuit is configured to output the first data if not compressed or the second data if the first data is compressed, together with the compression mode information.

Hereinafter, each embodiment will be described with reference to the drawings.

First Embodiment

Figure 1:
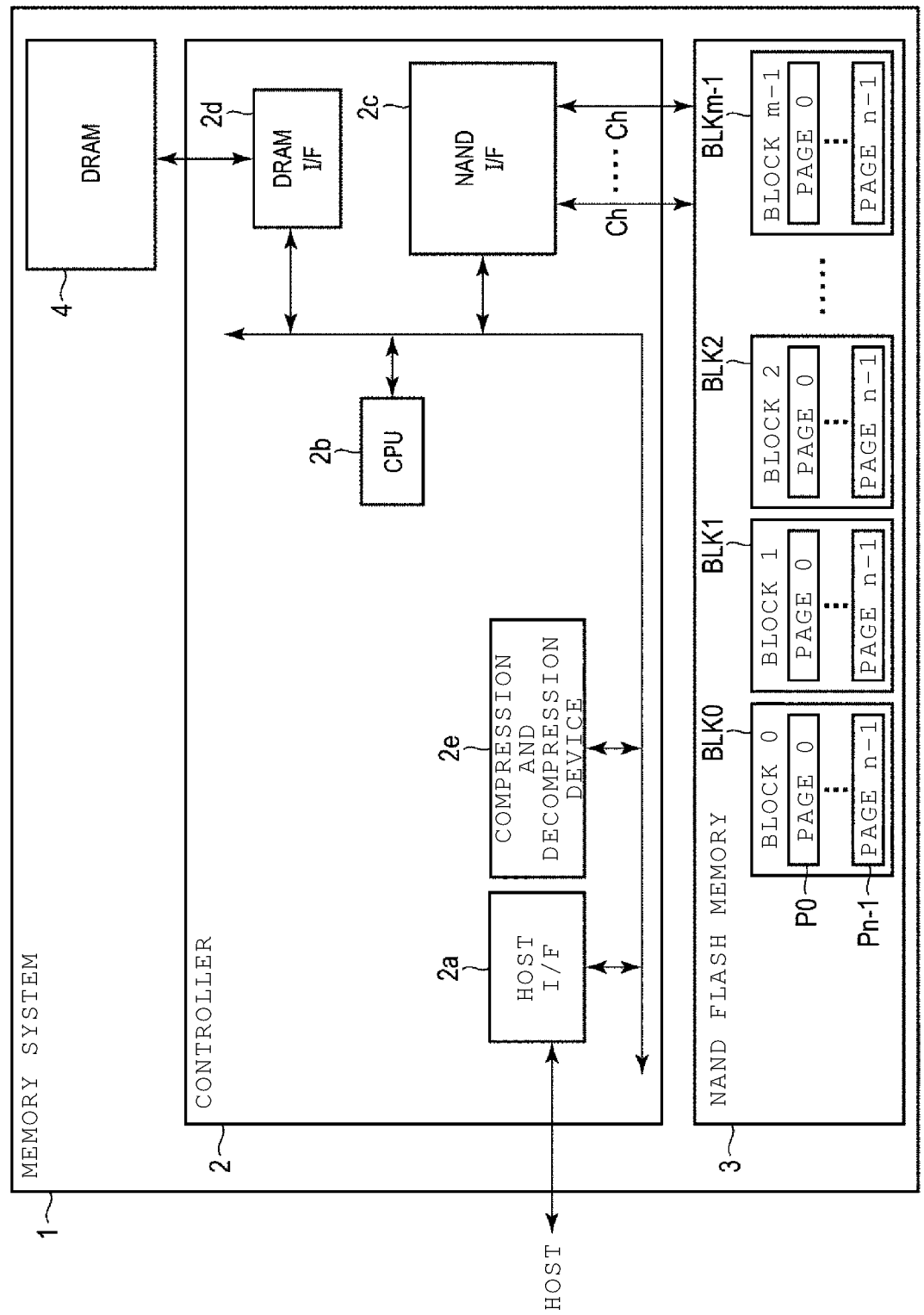
FIG. 1 is a block diagram schematically illustrating an example of a hardware configuration of a memory system according to a first embodiment.

First, a first embodiment will be described. FIG. 1 is a block diagram schematically illustrating an example of a hardware configuration of a memory system according to the present embodiment.

A memory system 1 illustrated in FIG. 1 is a semiconductor storage device configured to write data to a nonvolatile memory and read data from the nonvolatile memory. In the following description, it is assumed that the memory system 1 in the present embodiment is implemented by, for example, a solid state drive (SSD). Alternatively, the memory system 1 may be another storage device.

The memory system 1 is connectable to a host via a system bus such as a PCI Express bus. As illustrated in FIG. 1, the memory system 1 includes a controller 2, a NAND flash memory 3, and a dynamic random access memory (DRAM) 4.

The controller 2 has a function of controlling operations of the memory system 1 and controls the NAND flash memory 3 and the DRAM 4. The controller 2 includes a host interface (I/F) 2a, a CPU 2b, a NAND interface (I/F) 2c, a DRAM interface (I/F) 2d, and the like. The host interface 2a, the CPU 2b, the NAND interface 2c, and the DRAM interface 2d are interconnected via, for example, a bus.

The host interface 2a is a host interface circuit configured to execute communication with the host disposed outside the memory system 1. The host interface 2a may be, for example, a PCI Express controller or the like. The host interface 2a receives various commands (requests) from the host.

The CPU 2b is a processor configured to control the host interface 2a, the NAND interface 2c, and the DRAM interface 2d. The CPU 2b loads a control program (firmware) from the NAND flash memory 3 or a read-only memory (ROM, not illustrated) into the DRAM 4 in response to the memory system 1 being turned on and performs various processes by executing the control program. Specifically, the CPU 2b executes processing with respect to various commands issued by the host. Dedicated hardware in the controller 2 may execute the processing with respect to the commands issued by the host in whole or in part.

The NAND interface 2c is a memory control circuit configured to control the NAND flash memory 3 under the control of the CPU 2b.

Further, the controller 2 includes a compression and decompression device 2e. Although not illustrated in FIG. 1, the compression and decompression device 2e includes a compression device and a decompression device.

The compression device is used when, for example, a write command is issued by the host so that data (write data) specified in the write command is input and the data is compressed. The compression device compresses the data in accordance with a compression algorithm called deflate, which is a combination of, for example, dictionary encoding and entropy encoding (Huffman encoding). The data compressed by the compression device (hereinafter, referred to as compressed data) is output from the compression device, and then predetermined processing such as error correction processing and randomization processing is executed. With the predetermined processing executed on the compressed data, the CPU 2b writes the data to the NAND flash memory 3 via the NAND interface 2c. In other words, the CPU 2b writes data based on compressed data output from the compression device to the NAND flash memory 3.

When, for example, the CPU 2b reads compressed data from the NAND flash memory 3 based on a read command received from the host via the host interface 2a, the CPU 2b reads the data based on the read command from the NAND flash memory 3 via the NAND interface 2c. The read data is input to the decompression device by the CPU 2b as compressed data after predetermined processing such as error correction processing and randomization cancellation processing on the data is executed. The decompression device is configured to decompress the input compressed data. In other words, the decompression device decompresses compressed data based on data read from the NAND flash memory 3.

The NAND flash memory 3 is a nonvolatile memory and has a memory cell array including a plurality of memory cells formed in a matrix configuration. The NAND flash memory 3 may be a NAND flash memory having a two-dimensional structure or a NAND flash memory having a three-dimensional structure.

The memory cell array of the NAND flash memory 3 includes a plurality of blocks BLK0 to BLKm-1. Each of the blocks BLK0 to BLKm-1 includes multiple pages (here, pages P0 to Pn-1). The blocks BLK0 to BLKm-1 function as erasing units. Each of the pages P0 to Pn-1 includes a plurality of memory cells connected to the same word line. The pages P0 to Pn-1 are units of data write operation and data read operation.

The memory system 1 described here includes the NAND flash memory 3 as a nonvolatile memory. Alternatively, the memory system 1 may include, for example, a phase change memory (PCM) or a magnetoresistive random access memory (MRAM) as a nonvolatile memory.

The DRAM 4 is a volatile memory and functions as, for example, a temporary buffer of software executed in the controller 2 (CPU 2b), a temporary buffer for the NAND flash memory 3, or the like.

The memory system 1 described here includes the DRAM 4 as a volatile memory. Alternatively, the memory system 1 may include, for example, a static random access memory (SRAM) or the like as a volatile memory.

The compression and decompression device 2e (compression device and decompression device) in the present embodiment is implemented by hardware as a circuit. Alternatively, the compression and decompression device 2e may be implemented by software or a combination of software and hardware as a whole or in part.

Figure 2:
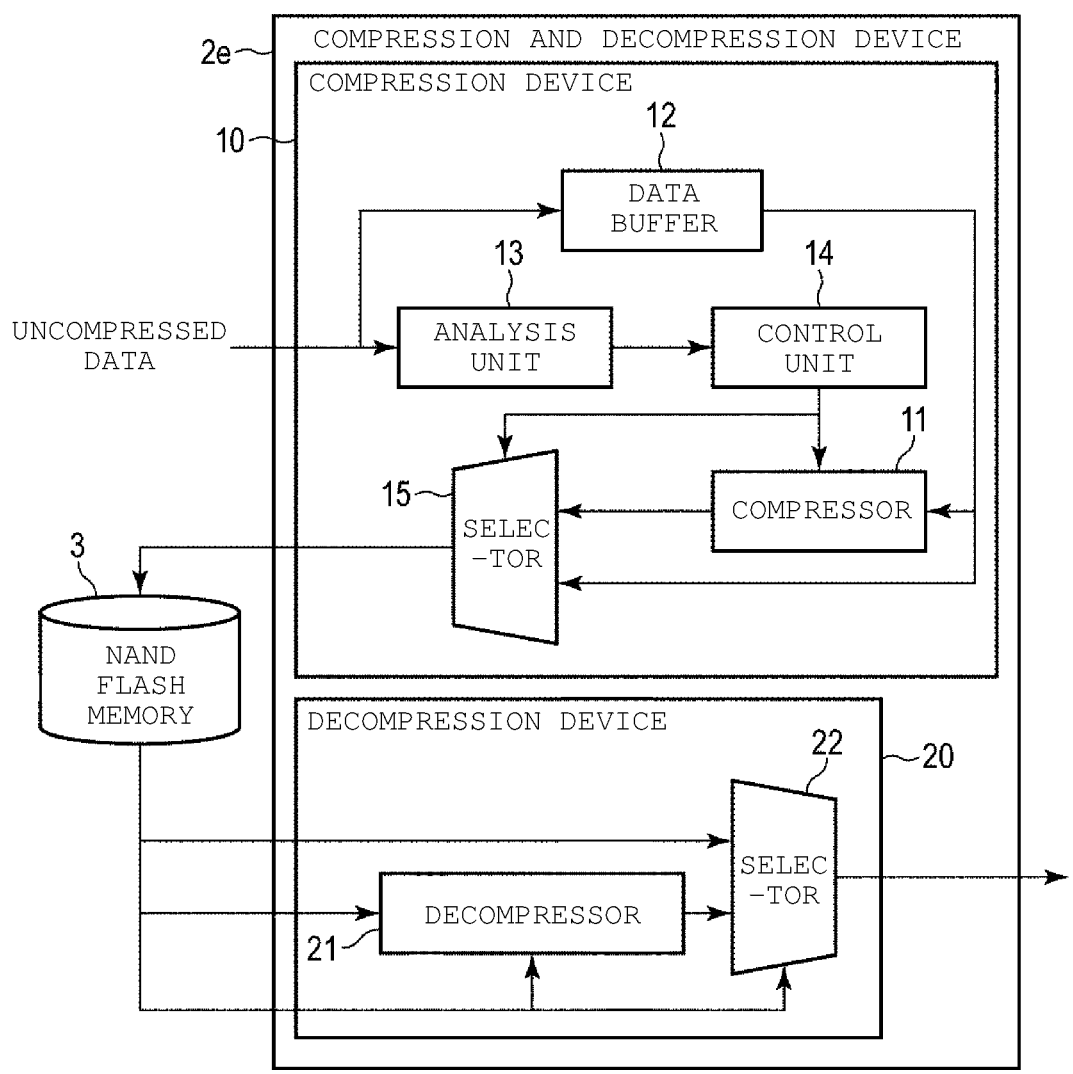
FIG. 2 is a diagram illustrating an example of a configuration of a compression and decompression device according to the first embodiment.

Hereinafter, an example of the configuration of the compression and decompression device 2e illustrated in FIG. 1 will be described with reference to FIG. 2. As illustrated in FIG. 2, the compression and decompression device 2e includes a compression device 10 and a decompression device 20.

The compression device 10 includes a compressor 11, a data buffer 12, an analysis unit 13, a control unit 14, and a selector 15.

The compressor (e.g., a compressor circuit) 11 has a function of compressing data input to the compression device 10 (hereinafter, referred to as uncompressed data) and outputting the compressed data (hereinafter, referred to as compressed data). The uncompressed data input to the compression device 10 is, for example, data specified as data (write data) to be written to the NAND flash memory 3 in a write command issued by the host. In addition, the uncompressed data is, for example, character string data (text) of a predetermined size (compression unit) processed in the compression device 10.

In the compression device 10 (compressor 11) according to the present embodiment, the uncompressed data is compressed in accordance with a compression algorithm (deflate) that is, for example, a combination of an encoding method (compression method) called dictionary encoding and an encoding method (compression method) called entropy encoding.

The dictionary encoding is an encoding method for converting data that is a dictionary encoding target (hereinafter, referred to as dictionary encoding target data) into a relative reference to data older than the dictionary encoding target data. Used as the dictionary encoding is, for example, LZ77, LZSS, LZ78, LZW, or the like.

Specifically, in the dictionary encoding, a past data storage buffer (hereinafter, referred to as a history buffer) is prepared and past data matching the dictionary encoding target data is searched from the history buffer.

When the past data matching the dictionary encoding target data is in the history buffer, the dictionary encoding target data is replaced with a set (hereinafter, referred to as matching data) of the address indicating the position in the history buffer where the past data is stored and a length matching the past data (hereinafter, referred to as a match length) and the matching data is output as a dictionary encoding result.

When the past data matching the dictionary encoding target data is not in the history buffer, the dictionary encoding target data (hereinafter, referred to as mismatching data) is output as a dictionary encoding result.

The entropy encoding is an encoding method for converting data that is an entropy encoding target (hereinafter, referred to as entropy encoding target data) into a code having a code length that is in accordance with the frequency of appearance of the entropy encoding target data. In other words, in accordance with the entropy encoding, a code amount is reduced as a whole by codes with different code lengths being allocated to the entropy encoding target data using the difference in the appearance frequency of the entropy encoding target data.

Used as the entropy encoding is, for example, Huffman encoding. When Huffman encoding is used as the entropy encoding, the Huffman encoding may be static Huffman encoding in which encoding is performed using a pre-built code tree or dynamic Huffman encoding in which a code tree is changed using Huffman encoding target data. Arithmetic encoding and the like may also be used as the entropy encoding.

The compressor 11 operates so as to perform dictionary encoding using each data partially cut out from uncompressed data input to the compression device 10 as dictionary target encoding data, perform entropy encoding using the result of the dictionary encoding (matching data and mismatching data) as entropy encoding target data, and output the result of the entropy encoding as compressed data.

The data buffer 12 is a buffer temporarily storing uncompressed data input to the compression device 10.

The analysis unit 13 (e.g., an analyzer circuit) inputs uncompressed data and analyzes (evaluates) the uncompressed data. Specifically, the analysis unit 13 stores a first prediction model for predicting power consumption of the compressor 11 (compression device 10) and a second prediction model for predicting power consumption of a decompressor 21 (decompression device 20). By applying uncompressed data to the first prediction model, the analysis unit 13 predicts the power consumption of the compressor 11 when the uncompressed data is compressed by the compressor 11. In addition, by applying uncompressed data to the second prediction model, the analysis unit 13 predicts the power consumption of the decompressor 21 when compressed data from the uncompressed data is decompressed by the decompressor 21.

The control unit (e.g., a control circuit) 14 controls the compressor 11 based on the analysis result of the analysis unit 13 (power consumption of the compressor 11 and power consumption of the decompressor 21). In this case, the control unit 14 makes a non-compression or compression decision with respect to uncompressed data. When the control unit 14 makes the non-compression decision with respect to the uncompressed data (that is, when the control unit 14 determines not to compress the uncompressed data), the control unit 14 outputs non-compression mode information indicating that the operation of the compressor 11 be stopped to the compressor 11 and the selector 15. When the control unit 14 makes the compression decision with respect to the uncompressed data (that is, when the control unit 14 determines to compress the uncompressed data), the control unit 14 outputs compression mode information indicating that the compressor 11 be operated to the compressor 11 and the selector 15.

The non-compression mode information is instruction information for not compressing the uncompressed data. When the non-compression mode information is output from the control unit 14, (the operation of) the compressor 11 stops based on the non-compression mode information. The compression mode information is instruction information for compressing the uncompressed data. When the compression mode information is output from the control unit 14, the compressor 11 operates so as to input the uncompressed data from the data buffer 12 based on the compression mode information and output compressed data that is compressed from the uncompressed data.

When the non-compression mode information is output by the control unit 14, the selector 15 selects and outputs uncompressed data stored in the data buffer 12 based on the non-compression mode information. When the compression mode information is output by the control unit 14, the selector selects and outputs compressed data output from the compressor 11 based on the compression mode information.

The non-compression mode information is added to the uncompressed data output from the selector 15. The compression mode information is added to the compressed data output from the selector 15.

The uncompressed or compressed data output from the selector 15 (compression device 10) as described above is written into the NAND flash memory 3. Processing such as the above error correction processing and randomization processing may be executed on the uncompressed or compressed data to be written to the NAND flash memory 3.

When a read command is issued by the host, data specified in the read command (hereinafter, referred to as read data) is read from the NAND flash memory 3 and the read data is input to the decompression device 20. In the present embodiment, the read data input to the decompression device 20 may be uncompressed data or compressed data. When the read data is uncompressed data, the non-compression mode information is added to the read data. When the read data is compressed data, the compression mode information is added to the read data.

When processing such as error correction processing and randomization processing is executed on the uncompressed or compressed data written to the NAND flash memory as described above, processing such as error correction processing and randomization cancellation processing is executed on the read data before the input to the decompression device 20.

The decompression device 20 includes the decompressor 21 and a selector 22. When the read data is input to the decompression device 20 as described above, the non-compression mode information or the compression mode information added to the read data is output to the decompressor 21 and the selector 22.

The decompressor (e.g., a decompressor circuit) 21 has a function of outputting uncompressed data obtained by decompressing compressed data input to the decompression device 20. Assuming that the compressor 11 employs a compression algorithm that is a combination of dictionary encoding and entropy encoding as described above, the decompressor 21 operates so as to perform entropy decoding on the compressed data and perform dictionary decoding on the result of the entropy decoding.

When the above non-compression mode information is output, (the operation of) the decompressor 21 stops based on the non-compression mode information. When the compression mode information is output, the decompressor 21 inputs read data (compressed data) based on the compression mode information and outputs uncompressed data obtained by decompressing the compressed data.

In addition, when the non-compression mode information is output, the selector 22 selects and outputs read data (uncompressed data) based on the non-compression mode information. When the compression mode information is output, the selector 22 selects and outputs uncompressed data output from the decompressor 21 based on the compression mode information.

Hereinafter, the operation of the compression and decompression device 2e according to the present embodiment will be described. In the present embodiment, the analysis unit 13 in the compression device 10 described above stores the first prediction model for predicting the power consumption of the compressor 11 and the second prediction model for predicting the power consumption of the decompressor 21.

Figure 3:
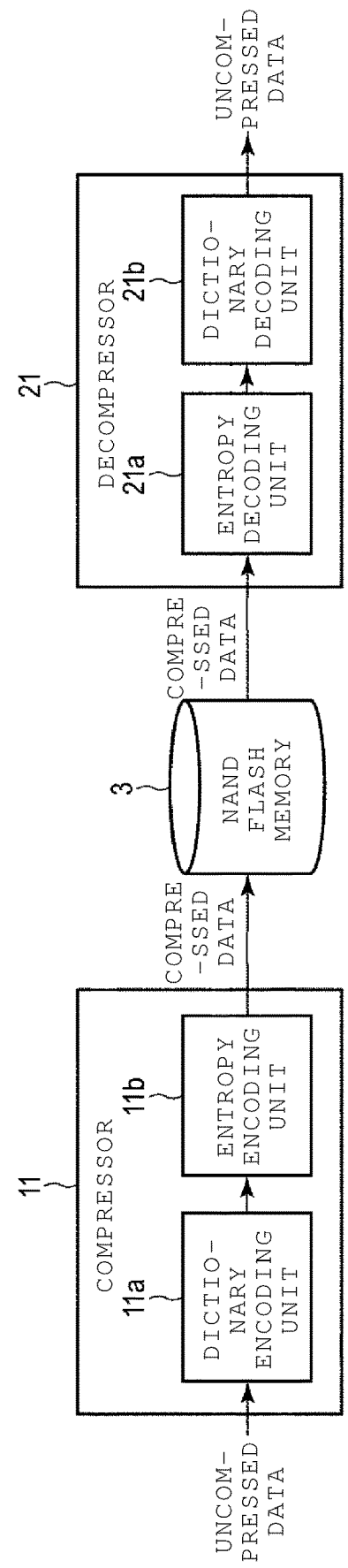
FIG. 3 is a diagram illustrating prediction model generation processing.

First, processing for generating the first and second prediction models stored in the analysis unit 13 (hereinafter, referred to as prediction model generation processing) will be described with reference to FIG. 3.

In the present embodiment, the compressor 11 in the compression device 10 is configured to perform dictionary encoding and entropy encoding as described above. In this case, the compressor 11 includes a dictionary encoding unit 11a that performs dictionary encoding and an entropy encoding unit 11b that performs entropy encoding as illustrated in FIG. 3.

As for the compressor 11, the dictionary encoding unit 11a performs dictionary encoding on uncompressed data input to the compressor 11. The entropy encoding unit 11b performs entropy encoding on the result of the dictionary encoding, and compressed data is output from the compressor 11 as a result. The compressed data output from the compressor 11 in this manner is written to the NAND flash memory 3.

The decompressor 21 in the decompression device 20 is configured to perform entropy decoding and dictionary decoding on the compressed data output from the compressor 11 when the compressor 11 performs dictionary encoding and entropy encoding as described above. The decompressor 21 in this case includes an entropy decoding unit 21a that performs entropy decoding and a dictionary decoding unit 21b that performs dictionary decoding as illustrated in FIG. 3.

As for the decompressor 21, the entropy decoding unit 21a performs entropy decoding on compressed data input to the decompressor 21 (that is, read data read from the NAND flash memory 3 in accordance with a read command issued by the host), dictionary decoding is performed on the result of the entropy decoding, and uncompressed data is output from the decompressor 21 as a result. The uncompressed data output from the decompressor 21 in this manner is returned to the host as a response to the read command.

Next, the power consumption of the compressor 11 described above will be described. It is conceivable that the power consumption of the compressor 11 can be represented by indices related thereto. Assuming in this case that the compressor 11 includes the dictionary encoding unit 11a and the entropy encoding unit 11b (that is, performs dictionary encoding and entropy encoding) as described above, the indices related to the power consumption of the compressor 11 include, for example, the match frequency on the occasion of the dictionary encoding on uncompressed data (hereinafter, referred to as a character string match frequency) and the number of occurrences of mismatching data subject to the entropy encoding performed after the dictionary encoding (hereinafter, referred to as a mismatching character string occurrence count).

The uncompressed data input to the compression device 10 as described above is compression unit data. In the dictionary encoding, each data partially cut out from the uncompressed data is sequentially processed as dictionary encoding data, and thus the entire uncompressed data can be replaced with matching and mismatching data. In this case, the character string match frequency means how many times the matching data is output (that is, how many times the past data stored in the history buffer is matched) when dictionary encoding is performed on each data (character string) partially cut out from the uncompressed data.

In the present embodiment, the character string match frequency (hereinafter, referred to as a first index $PE_1$) is used as an index related to the power consumption of the compressor 11 from the viewpoint that the character string match frequency described above significantly contributes to the power consumption of the dictionary encoding unit 11a.

In addition, the matching or mismatching data that is a dictionary encoding result (hereinafter, referred to as a symbol) is input to the entropy encoding unit 11b and the above mismatching character string occurrence count means the number of mismatching data (mismatching character strings) input to the entropy encoding unit 11b.

In the present embodiment, the mismatching character string occurrence count (hereinafter, referred to as a first index $PE_2$) is used as an index related to the power consumption of the compressor 11 from the viewpoint that the above mismatching character string occurrence count significantly contributes to the power consumption of the entropy encoding unit 11b.

A simple circuit (hereinafter, referred to as a first index calculation circuit) obtaining the first index $PE_1$ and the first index $PE_2$ on the occasion of uncompressed data input to the compressor 11 is prepared so that the first prediction model for predicting the power consumption of the compressor 11 described above is generated. The first index calculation circuit is a circuit equivalent to a part of the compressor 11. It is noted that the first index calculation circuit does not have to actually compress uncompressed data. The first index calculation circuit is smaller than the compressor 11, and is operable with low power consumption.

Figure 4:
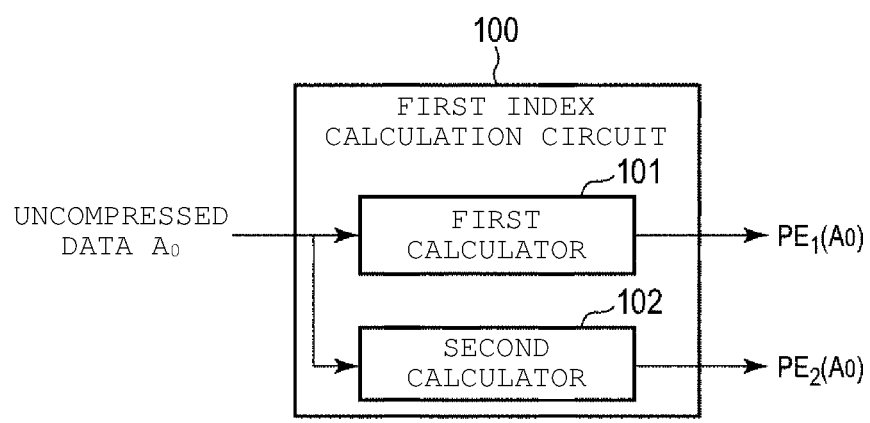
FIG. 4 is a diagram illustrating an example of a first index calculation circuit.

An example of the first index calculation circuit is illustrated in FIG. 4. As illustrated in FIG. 4, a first index calculation circuit 100 includes a first calculator 101 and a second calculator 102.

The first calculator 101 calculates a first index $PE_1$ ($A_0$) at a time when uncompressed data (input data) $A_0$ is input to the compressor 11. In other words, with the first calculator 101, the first index $PE_1$ ($A_0$) can be obtained from the uncompressed data $A_0$.

The second calculator 102 calculates a first index $PE_2$ ($A_0$) at a time when the uncompressed data (input data) $A_0$ is input to the compressor 11. In other words, with the second calculator 102, the first index $PE_2$ ($A_0$) can be obtained from the uncompressed data $A_0$.

In addition, the power consumption of the compressor 11 when the uncompressed data $A_0$ is input to the compressor 11 is measured by, for example, resister transfer level (RTL) simulation or the like so that the first prediction model is generated. According to this, power consumption W ($A_0$) of the compressor 11 can be obtained from the uncompressed data $A_0$.

In the above description, it is assumed that the first index $PE_1$ ($A_0$), the first index $PE_2$ ($A_0$), and the power consumption W ($A_0$) (hereinafter, referred to as a data set) can be obtained from the uncompressed data $A_0$. It is further assumed that such a data set is obtained from, for example, each of M uncompressed data $A_0$ to $A_M$ prepared in advance. According to this, M data sets can be obtained.

In the present embodiment, it is assumed that the first prediction model to predict power consumption WE ($A_N$) of the compressor 11 at a time when uncompressed data $A_N$ is input is expressed by the following Equation (1).

$$WE(A_N)=PE_1(A_N)\times CE_1+PE_2(A_N)\times CE_2+E \quad \text{Equation (1)}$$

$CE_1$ and $CE_2$ in Equation (1) are correlation coefficients, and E is an intercept by linear regression analysis.

With the first prediction model expressed by the above Equation (1), the power consumption WE ($A_N$) of the compressor 11 at a time when the uncompressed data $A_N$ is compressed can be predicted from the first index $PE_1$ ($A_N$) and the first index $PE_2$ ($A_N$) based on the uncompressed data $A_N$ insofar as the correlation coefficients $CE_1$ and $CE_2$ and the intercept E can be obtained.

To achieve this objective, in the present embodiment, the correlation coefficients $CE_1$ and $CE_2$ and the intercept E in Equation (1) are calculated by regression analysis performed on the above M data sets.

According to this, the first prediction model is generated by the correlation coefficients $CE_1$ and $CE_2$ and the intercept E calculated as described above being reflected in Equation (1).

Next, the power consumption of the decompressor 21 will be described. It is conceivable that the power consumption of the decompressor 21 can be represented with indices related thereto. Assuming in this case that the decompressor 21 includes the entropy decoding unit 21a and the dictionary decoding unit 21b (that is, performs entropy decoding and dictionary decoding as described above, the indices related to the power consumption of the decompressor 21 include, for example, the number of occurrences of a symbol to be decoded in the entropy decoding (hereinafter, referred to as a decoding symbol occurrence count) and the number of occurrences of a match length to be decoded in the dictionary decoding (hereinafter, referred to as a decoding match length occurrence count).

Codes are allocated to symbols (matching and mismatching data as dictionary encoding results) in the entropy encoding, and the decoding symbol occurrence count is the number of codes in the compressed data input to the entropy decoding unit 21a (codes allocated to the symbols) and corresponds to the number of all symbols input to the entropy encoding unit 11b in the compressor 11 when the uncompressed data is compressed.

In the present embodiment, the decoding symbol occurrence count (hereinafter, referred to as a second index $PD_1$) is used as an index related to the power consumption of the decompressor 21 from the viewpoint that the decoding symbol occurrence count significantly contributes to the power consumption of the entropy decoding unit 21a.

In addition, when the data partially cut out from the uncompressed data in the dictionary encoding unit 11a in the compressor 11 is replaced with matching data (that is, the data matches the past data), the matching data needs to be converted (decoded) into data (character string) cut out from uncompressed data in the dictionary decoding. Accordingly, the decoding match length occurrence count is the number of matching data input to the dictionary decoding unit 21b as entropy decoding results and corresponds to the character string match frequency in the dictionary encoding described above.

In the present embodiment, the decoding match length occurrence count (hereinafter, referred to as a second index $PD_2$) is used as an index related to the power consumption of the decompressor 21 from the viewpoint that the decoding match length occurrence count significantly contributes to the power consumption of the dictionary decoding unit 21b.

A simple circuit (hereinafter, referred to as a second index calculation circuit) obtaining the second index $PD_1$ and the second index $PD_2$ at a time when compressed data (read data read from the NAND flash memory 3) is input to the decompressor 21 is prepared so that the second prediction model for predicting the power consumption of the decompressor 21 described above is generated. The second index $PD_1$ corresponds to the number of all symbols input to the entropy encoding unit 11b in the compressor 11, the second index $PD_2$ corresponds to the character string match frequency in dictionary encoding. Thus, the second index calculation circuit may be implemented by, for example, a circuit equivalent to a part of the compressor 11. In an alternative configuration, the second index calculation circuit may be implemented by a circuit different from (a part of) the compressor 11.

Figure 5:
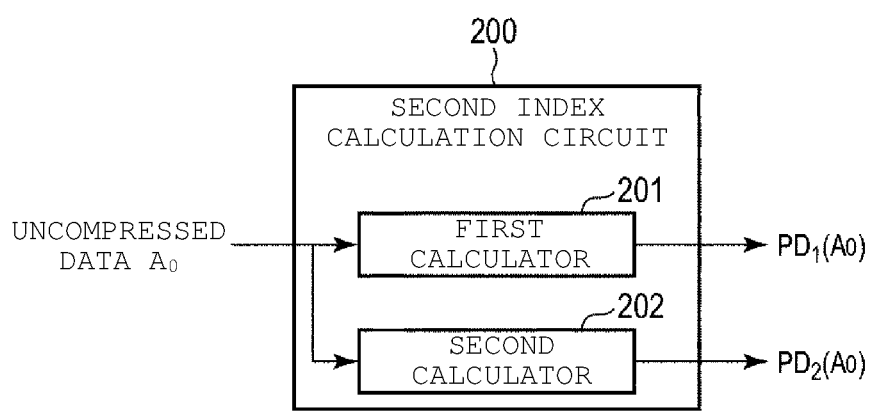
FIG. 5 is a diagram illustrating an example of a second index calculation circuit.

An example of the second index calculation circuit is illustrated in FIG. 5. As illustrated in FIG. 5, a second index calculation circuit 200 includes a first calculator 201 and a second calculator 202.

The first calculator 201 calculates a second index $PD_1$ ($A_0'$) at a time when compressed data (input data) $A_0'$ obtained by the uncompressed data $A_0$ being compressed is input to the decompressor 21.

The second calculator 202 calculates a second index $PD_2$ ($A_0'$) at a time when the compressed data (input data) $A_0'$ obtained by the uncompressed data $A_0$ being compressed is input to the decompressor 21.

Here, it is assumed that the compressed data $A_0'$ obtained by compression of the uncompressed data $A_0$ is input to the decompressor 21. Since the compressor 11 does not actually compress the uncompressed data $A_0$ in the prediction model generation processing, it is also assumed that the first calculator 201 is configured to calculate a second index $PD_1$ ($A_0$) using the uncompressed data $A_0$ as input. In other words, with the first calculator 201, the second index $PD_1$ ($A_0$) can be obtained from the uncompressed data $A_0$.

Likewise, it is assumed that the second calculator 202 is configured to calculate a second index $PD_2$ ($A_0$) using the uncompressed data $A_0$ as input. In other words, with the second calculator 202, the second index $PD_2$ ($A_0$) can be obtained from the uncompressed data $A_0$.

In addition, the power consumption of the decompressor 21 when the compressed data $A_0'$ compressed from the uncompressed data $A_0$ is input to the decompressor 21 is measured by, for example, RTL simulation or the like so that the second prediction model is generated. According to this, the power consumption W ($A_0$) of the decompressor 21 can be obtained from the uncompressed data $A_0$.

In the above description, it is assumed that the second index $PD_1$ ($A_0$), the second index $PD_2$ ($A_0$), and the power consumption W ($A_0$) (data set) can be obtained from the uncompressed data $A_0$. It is further assumed that such a data set is obtained from each of the M uncompressed data $A_0$ to $A_M$ described above. According to this, M data sets can be obtained.

In the present embodiment, it is assumed that the second prediction model predicting power consumption WD ($A_N$) of the decompressor 21 at a time when the uncompressed data $A_N$ is input to the compressor 11 and compressed data $A_N'$ output from the compressor 11 is input to the decompressor 21 is expressed by the following Equation (2).

$$WD(A_N)=PD_1(A_N)\times CD1+PD_2(A_N)\times CD_2+D \quad \text{Equation (2)}$$

$CD_1$ and $CD_2$ in Equation (2) are correlation coefficients, and D is an intercept by linear regression analysis.

With the second prediction model expressed by the above Equation (2), the power consumption WD ($A_N$) of the decompressor 21 can be predicted from the second index $PD_1$ ($A_N$) and the second index $PD_2$ ($A_N$) based on the uncompressed data $A_N$ insofar as the correlation coefficients $CD_1$ and $CD_2$ and the intercept D can be obtained.

To achieve this objective, in the present embodiment, the correlation coefficients $CD_1$ and $CD_2$ and the intercept D in Equation (2) are calculated by regression analysis performed on the above M data sets.

According to this, the second prediction model is generated by the correlation coefficients $CD_1$ and $CD_2$ and the intercept D calculated as described above being reflected in Equation (2).

In the prediction model generation processing described above, regression analysis is performed offline using a large data set including an index correlated with the power consumption of the compressor 11 and the decompressor 21 and the measured power consumption. As a result, the first prediction model for predicting the power consumption of the compressor 11 and the second prediction model for predicting the power consumption of the decompressor 21 can be generated.

The prediction model generation processing described above may be executed in, for example, the compression and decompression device 2e. Alternatively, the prediction model generation processing described above may be executed outside the compression and decompression device 2e (or the memory system 1). The first prediction model and the second prediction model generated as a result of the prediction model generation processing are stored in the analysis unit 13 in the compression device 10.

Figure 6:
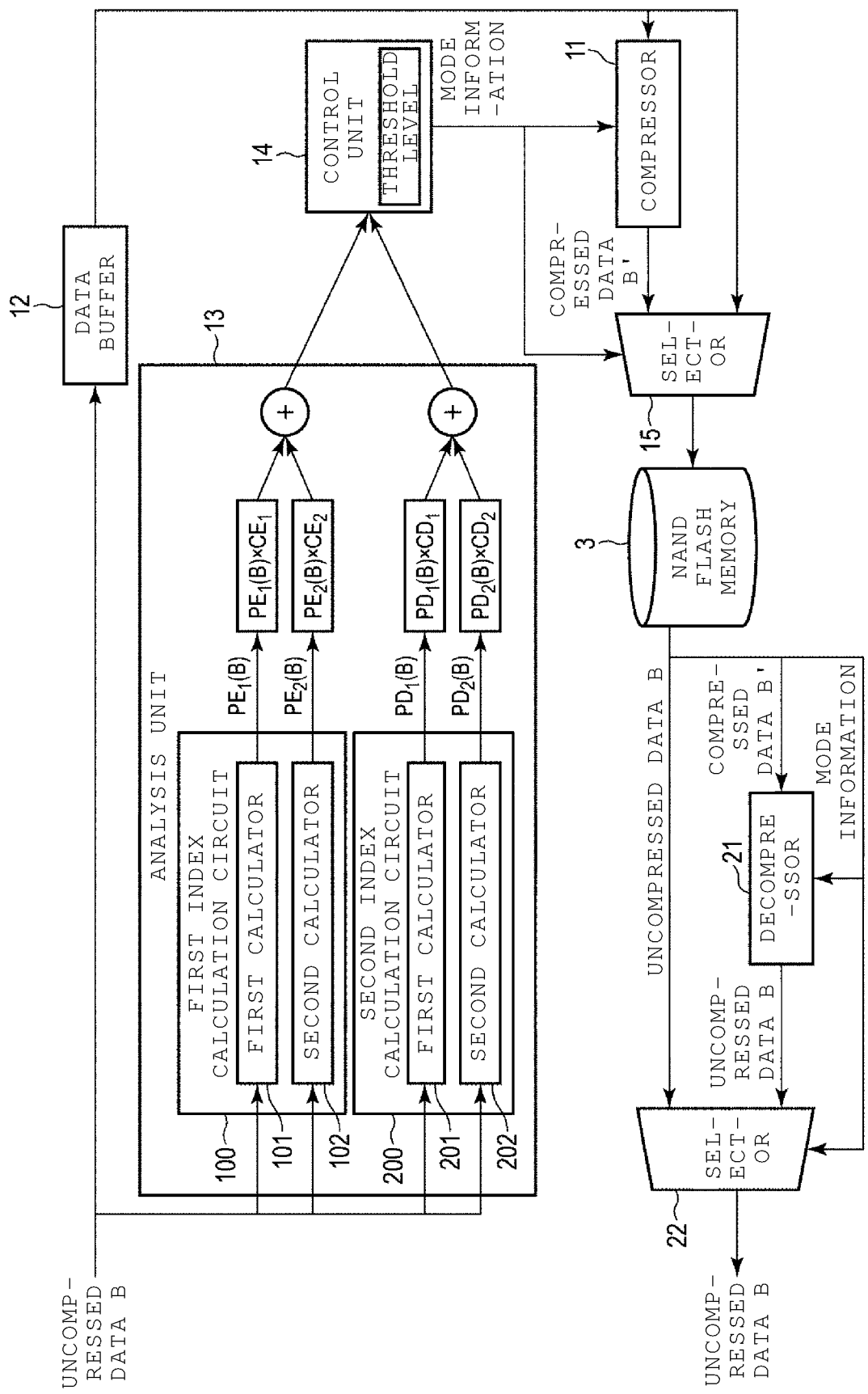
FIG. 6 is a diagram illustrating processing of the compression and decompression device when a write command and a read command are issued by a host.

Next, processing (compression and decompression processing) of the compression and decompression device 2e when a write command and a read command are issued by the host will be described with reference to FIG. 6.

First, a case where a write command is issued by the host will be described. In this case, uncompressed data (write data) B specified in the write command issued by the host is input to the compression device 10 in the compression and decompression device 2e.

In this case, the uncompressed data B input to the compression device 10 is stored in the data buffer 12 and input to the analysis unit 13.

Here, it is assumed that the analysis unit 13 stores the first prediction model and the second prediction model generated in the prediction model generation processing described above and includes the first index calculation circuit 100 illustrated in FIG. 4 and the second index calculation circuit 200 illustrated in FIG. 5.

In this case, the first calculator 101 in the first index calculation circuit 100 calculates a first index $PE_1$ (B) from the uncompressed data B. The second calculator 102 in the first index calculation circuit 100 calculates a first index $PE_2$ (B) from the uncompressed data B.

Next, the analysis unit 13 predicts the power consumption of the compressor 11 when the uncompressed data B is input to the compressor 11 by applying the first index $PE_1$ (B) calculated by the first calculator 101 and the first index $PE_2$ (B) calculated by the second calculator 102 to the first prediction model stored in the analysis unit 13. As briefly illustrated for convenience in FIG. 6, power consumption WE (B) of the compressor 11 predicted by the analysis unit 13 is $PE_1$ (B)$\times CE_1+PE_2$ (B)$\times CE_2+E$ as described above.

In addition, the first calculator 201 in the second index calculation circuit 200 calculates a second index $PD_1$ (B) from the uncompressed data B. The second calculator 202 in the second index calculation circuit 200 calculates a second index $PD_2$ (B) from the uncompressed data B.

Next, the analysis unit 13 predicts the power consumption of the decompressor 21 at a time when compressed data B' output from the compressor 11 by the uncompressed data B being input to the compressor 11 is input to the decompressor 21 by applying the second index $PD_1$ (B) calculated by the first calculator 201 and the second index $PD_2$ (B) calculated by the second calculator 202 to the second prediction model stored in the analysis unit 13. As briefly illustrated for convenience in FIG. 6, power consumption WD (B) of the decompressor 21 predicted by the analysis unit 13 is $PD_1$ (B)$\times CD_1+PD_2$ (B)$\times CD_2+D$ as described above.

The control unit 14 stores a threshold level and compares the threshold level to the total value of the power consumption of the compressor 11 (WE (B)) and the power consumption of the decompressor 21 (WD (B)) predicted as described above (hereinafter, referred to as predicted power consumption). The control unit 14 controls the compressor 11 based on the result of the comparison between the predicted power consumption and the threshold level. In this case, the control unit 14 makes a non-compression or compression decision with respect to uncompressed data (that is, determines whether to operate the compressor 11) and outputs mode information to the compressor 11 and the selector 15.

The mode information output from the control unit 14 is non-compression mode information or compression mode information. The non-compression mode information is information indicating that the operation of the compressor 11 is stopped, and the control unit 14 outputs the non-compression mode information when the predicted power consumption is equal to or greater than the threshold level. The compression mode information is information indicating that the compressor 11 is operated, and the control unit 14 outputs the compression mode information when the predicted power consumption is less than the threshold level. The (non-compression and compression) mode information output from the control unit 14 may be information such as a flag.

When the non-compression mode information is output from the control unit 14, the operation of the compressor 11 is stopped based on the non-compression mode.

In this case, the compressed data B' is not output from the compressor 11, and thus the selector 15 selects the uncompressed data B stored in the data buffer 12 based on the non-compression mode information output from the control unit 14 and outputs the uncompressed data B.

The uncompressed data B output from the selector 15 is written to the NAND flash memory 3 with the above non-compression mode information added.

When the compression mode information is output from the control unit 14, the compressor 11 operates so as to compress the uncompressed data B stored in the data buffer 12. As a result, the compressor 11 outputs the compressed data B' compressed from the uncompressed data B to the selector 15.

In this case, the selector 15 selects the compressed data B' output from the compressor 11 based on the compression mode information output from the control unit 14 and outputs the compressed data B'.

The compressed data B' output from the selector 15 is written to the NAND flash memory 3 with the above compression mode information added.

Next, a case where a read command in which the uncompressed data B is specified is issued by the host will be described. In this case, read data is read from the NAND flash memory 3 based on the read command issued by the host and the read data is input to the decompression device 20.

The read data input to the decompression device 20 is the uncompressed data B or the compressed data B'. As described above, non-compression mode information is added to the uncompressed data B and compression mode information is added to the compressed data B'.

Assumed first is a case where the non-compression mode information is added to the read data input to the decompression device 20.

In this case, the non-compression mode information is output to the decompressor 21 and the selector 22, and the operation of the decompressor 21 is stopped based on the non-compression mode information.

In addition, the read data to which the non-compression mode information is added is the uncompressed data B and the uncompressed data B is output to the selector 15. The selector 15 selects the uncompressed data B based on the non-compression mode information and outputs the uncompressed data B.

A case is assumed where the compression mode information is added to the read data input to the decompression device 20.

In this case, the compression mode information is output to the decompressor 21 and the selector 22 and the decompressor 21 operates based on the compression mode information. Specifically, the read data to which the compression mode information is added is the compressed data B' and the decompressor 21 inputs the compressed data B' and outputs the uncompressed data B decompressed from the compressed data B'.

The selector 15 selects the uncompressed data B output from the decompressor 21 based on the non-compression mode information and outputs the uncompressed data B.

The uncompressed data B output from the selector 15 as described above is returned to the host as a response to the read command issued by the host.

As described above, the compression device 10 according to the present embodiment outputs the non-compression mode information indicating that the operation of the compressor 11 is stopped or the compression mode information indicating that the compressor 11 is operated based on an analysis result regarding uncompressed data (first data). Further, the compression device 10 outputs uncompressed data when the non-compression mode information is output, and outputs compressed data (second data) output from the compressor 11 when the compression mode information is output. In addition, when uncompressed data is output from the compression device 10 (selector 15), the non-compression mode information is added to the uncompressed data. When compressed data is output from the compression device 10 (selector 15), the compression mode information is added to the compressed data.

With such a configuration in the present embodiment, it is possible to stop the operation of the compressor 11 in accordance with the analysis result regarding the uncompressed data input to the compression and decompression device 2e (compression device 10) and reduce the power consumption of the compression and decompression device 2e (compression device 10).

In the present embodiment, the power consumption of the compressor 11 (first power consumption) and the power consumption of the decompressor 21 (second power consumption) are predicted from uncompressed data. Further, the non-compression mode information is output when the total value of the predicted power consumption (predicted power consumption) is equal to or greater than a threshold level, and the compression mode information is output when the predicted power consumption is less than the threshold level. Here, the predicted power consumption is the total value of the power consumption of the compressor 11 and the power consumption of the decompressor 21. Alternatively, the predicted power consumption may be either the power consumption of the compressor 11 or the power consumption of the decompressor 21.

According to this, the power consumption of the compression and decompression device 2e can be reduced when it is predicted based on the uncompressed data that the power consumption is large.

When, for example, the power consumption of the compression and decompression device 2e is large, the heat generation amount of the entire circuit in the compression and decompression device 2e may increase to result in a thermal slot state (that is, a state where the performance is lowered for temperature reduction). In this case, the compressor 11 and the decompressor 21 are operated (that is, uncompressed data is compressed) and thus a decline in the speed of data writing to the NAND flash memory 3 and a decline in the speed of data reading from the NAND flash memory 3 are caused. Accordingly, making non-compression and compression decisions with respect to uncompressed data in accordance with the uncompressed data as in the present embodiment is also useful from the viewpoint of preventing the decline in the speed of data writing to the NAND flash memory 3 and the decline in the speed of data reading from the NAND flash memory 3.

The following comparative configuration may be conceived. That is, the operation of the compressor 11 at a time when uncompressed data is input may be stopped from the (actual) result of compression of uncompressed data input in the past. However, in such a configuration, there is no guarantee that the stopping of the operation of the compressor 11 is appropriate if uncompressed data not correlated with the uncompressed data that has been input in the past is input.

Specifically, a case where the compressor 11 performs dictionary encoding having a high compression effect when the same data repeatedly appears at predetermined intervals and run-length encoding having a high compression effect when the same data continuously appears is assumed as an example. In such a case, uncompressed data in which the same data repeatedly appears may be input after the operation of the dictionary encoding (module) is stopped by the same data continuously appearing in uncompressed data input in the past. In the run-length encoding in this case, the uncompressed data cannot be appropriately compressed (encoded), and thus a decline in compression efficiency arises.

On the other hand, according to the present embodiment, a non-compression or compression decision is made with respect to uncompressed data based on the uncompressed data itself as an analysis target, and thus a decline in compression efficiency can be prevented.

When read data (uncompressed data) is input with non-compression mode information added, the decompression device 20 according to the present embodiment stops the operation of the decompressor 21 based on the non-compression mode information and outputs uncompressed data. When read data (compressed data) is input with compression mode information added, the decompression device 20 may operate so as to operate the decompressor 21 based on the compression mode information and output uncompressed data decompressed from the compressed data.

According to this, the operation of the decompressor 21 is stopped in the decompression device 20 when the operation of the compressor 11 is stopped in the compression device 10, and thus the power consumption of the decompression device 20 can be reduced.

In the present embodiment, the first prediction model for predicting the power consumption of the compressor 11 and the second prediction model for predicting the power consumption of the decompressor 21 are stored. The first prediction model is generated by, for example, regression analysis being performed on an index (first index) related to the power consumption of the compressor 11 calculated from M uncompressed data (plurality of third data) and the power consumption of the compressor 11 measured by simulation in which the uncompressed data is compressed into compressed data. The second prediction model is generated by, for example, regression analysis being performed on an index (second index) related to the power consumption of the decompressor 21 calculated from M uncompressed data and the power consumption of the decompressor 21 measured by simulation in which compressed data is decompressed into uncompressed data.

In the present embodiment, the power consumption of the compressor 11 and the power consumption of the decompressor 21 can be predicted with high accuracy using the first prediction model and the second prediction model, respectively. Specifically, when uncompressed data is input to the compression device 10, indices (first and second indices) are calculated from the uncompressed data and the indices are applied to the first prediction model and the second prediction model. As a result, the power consumption of the compressor 11 and the power consumption of the decompressor 21 can be predicted.

The compressor 11 in the present embodiment compresses uncompressed data in accordance with a compression algorithm that is a combination of dictionary encoding and entropy encoding. Alternatively, another compression algorithm may be employed in the compressor 11.

The compression and decompression device 2e in the present embodiment is incorporated in the controller 2. Alternatively, the compression and decompression device 2e may be provided outside the controller 2. Further, the compression and decompression device 2e may be provided outside the memory system 1. In the present embodiment, it is assumed that the compression and decompression device 2e is one device including the compression device 10 and the decompression device 20. Alternatively, the compression device 10 and the decompression device 20 may be implemented by independent devices.

The uncompressed data in the present embodiment is mainly described as character string data (text). Alternatively, the uncompressed data may be data in another format such as image data.

Second Embodiment

Next, a second embodiment will be described. The memory system according to the second embodiment is similar in hardware configuration to the memory system according to the first embodiment described above, and thus the second embodiment will be described with reference to FIG. 1 for convenience.

The present embodiment is different from the first embodiment described above in that the compressor 11 is controlled also based on a compression ratio assumed when uncompressed data is compressed (that is, switching occurs between non-compression and compression of uncompressed data).

Figure 7:
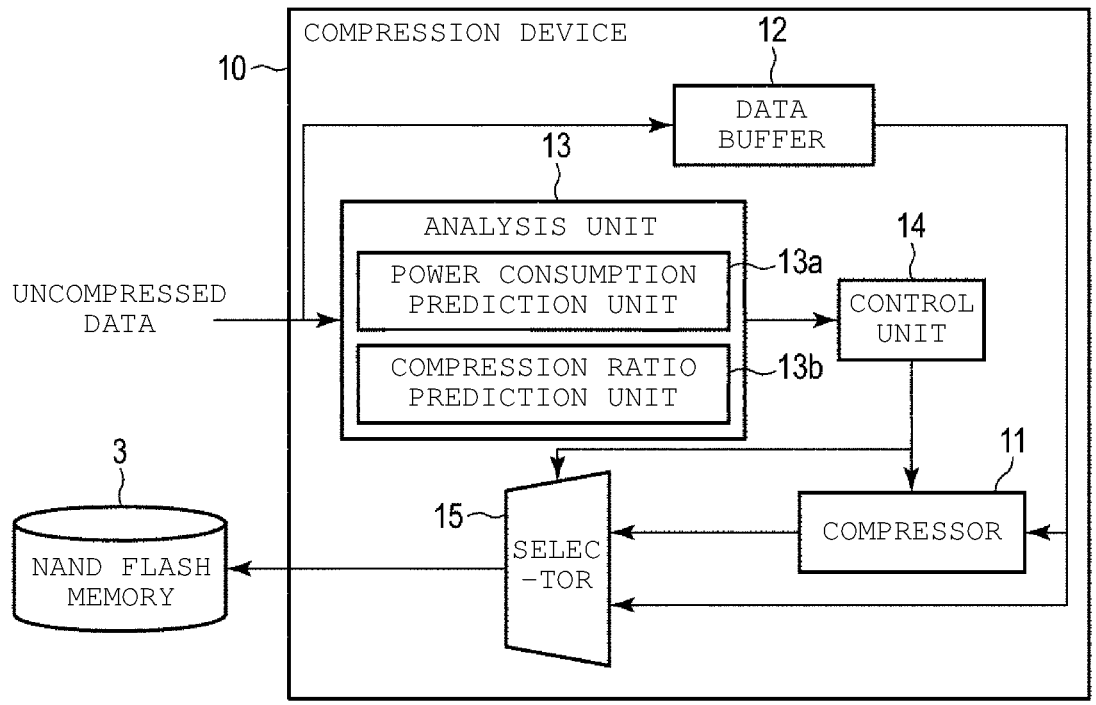
FIG. 7 is a diagram illustrating an example of a configuration of a compression device according to a second embodiment.

First, an example of a configuration of the compression device 10 according to the present embodiment will be described with reference to FIG. 7. In FIG. 7, the same reference numerals are given to elements similar to those of the compression device 10 illustrated in FIG. 2 and described above with the detailed description thereof omitted. Here, differences from the compression device 10 illustrated in FIG. 2 will be mainly described. The decompression device 20 according to the present embodiment is similar in configuration to the decompression device 20 according to the first embodiment described above, and thus the decompression device 20 according to the present embodiment is not illustrated in FIG. 7.

The compression device 10 includes the analysis unit 13 as in the first embodiment described above. The analysis unit 13 in the present embodiment includes a power consumption prediction unit 13a and a compression ratio prediction unit 13b as illustrated in FIG. 7.

The power consumption prediction unit 13a predicts the power consumption of the compressor 11 and the power consumption of the decompressor 21 from uncompressed data input to the analysis unit 13 as described in the first embodiment. The power consumption prediction unit 13a in the present embodiment corresponds to the analysis unit 13 in the first embodiment described above.

The compression ratio prediction unit 13b analyzes (evaluates) the uncompressed data input to the analysis unit 13 and predicts a compression ratio of compressing the uncompressed data. In the present embodiment, the compression ratio means a ratio of the size of compressed data (compressed data from the uncompressed data) to (e.g., divided by) the size of the uncompressed data.

The compression ratio prediction unit 13b calculates, for example, the primary entropy of uncompressed data from the uncompressed data and predicts the degree to which the uncompressed data is compressed based on the primary entropy. The primary entropy of the uncompressed data is based on, for example, the frequency of character string appearance in the uncompressed data, and the compression ratio at a time when the uncompressed data is compressed is predefined in association with the primary entropy calculated from the uncompressed data. According to this, the compression ratio at a time when the uncompressed data is compressed can be predicted by the primary entropy of the uncompressed data being calculated.

The compression ratio in the present embodiment may be, for example, an index related to whether uncompressed data can be efficiently compressed and may be predicted by another method. In this case, the compression ratio may be predicted based on, for example, the first index (match frequency) calculated by the first calculator 101 and the above primary entropy.

The control unit 14 controls the compressor 11 based on the total value of the power consumption of the compressor 11 and the power consumption of the decompressor 21 predicted by the power consumption prediction unit 13a (that is, predicted power consumption) and the compression ratio predicted by the compression ratio prediction unit 13b.

Next, the operation of the compression device 10 at a time when a write command is issued by the host in the present embodiment will be described.

When the write command is issued by the host, uncompressed data (write data) specified in the write command is input to the compression device 10.

In this case, the uncompressed data input to the compression device 10 is stored in the data buffer 12 and input to the analysis unit 13.

Next, the power consumption prediction unit 13a in the analysis unit 13 predicts the power consumption of the compressor 11 from the uncompressed data using the first prediction model and predicts the power consumption of the decompressor 21 from the uncompressed data using the second prediction model. The processing of the power consumption prediction unit 13a predicting the power consumption of the compressor 11 and the power consumption of the decompressor 21 is similar to the processing of the analysis unit 13 described in the first embodiment, and thus detailed description thereof is omitted here. The power consumption of the compressor 11 and the power consumption of the decompressor 21 predicted by the power consumption prediction unit 13a are output to the control unit 14.

In addition, the compression ratio prediction unit 13b in the analysis unit 13 predicts the compression ratio of compressing uncompressed data. The compression ratio predicted by the compression ratio prediction unit 13b is as described above, and thus detailed description thereof is omitted here. The compression ratio predicted by the compression ratio prediction unit 13b is output to the control unit 14.

Here, the control unit 14 stores a threshold level (hereinafter, referred to as a first threshold level) to be compared to the total value of the power consumption of the compressor 11 and the power consumption of the decompressor 21 output from the power consumption prediction unit 13a (that is, predicted power consumption) and a threshold level (hereinafter, referred to as a second threshold level) to be compared to the compression ratio output from the compression ratio prediction unit 13b (hereinafter, referred to as a predicted compression ratio).

The control unit 14 makes a non-compression or compression decision with respect to uncompressed data based on the result of comparison between the predicted power consumption and the first threshold level and the result of comparison between the predicted compression ratio and the second threshold level and outputs mode information (non-compression mode information or compression mode information) to the compressor 11 and the selector 15.

In the first embodiment described above, the non-compression mode information is output when the predicted power consumption is equal to or greater than the threshold level (first threshold level) and the compression mode information is output when the predicted power consumption is less than the threshold level. Meanwhile, in the present embodiment, control is performed such that, for example, the compressor 11 is operated even at a large predicted power consumption if the predicted compression ratio is high or the operation of the compressor 11 is stopped even at a small predicted power consumption when the predicted compression ratio is low.

Specifically, when, for example, the predicted power consumption is equal to or greater than the first threshold level and the predicted compression ratio is equal to or greater than the second threshold level, the control unit 14 determines to compress the uncompressed data and outputs compression mode information.

When, for example, the predicted power consumption is less than the first threshold level and the predicted compression ratio is less than the second threshold level, the control unit 14 determines not to compress the uncompressed data and outputs non-compression mode information.

When, for example, the predicted power consumption is equal to or greater than the first threshold level and the predicted compression ratio is less than the second threshold level, the control unit 14 determines not to compress the uncompressed data and outputs non-compression mode information. When, for example, the predicted power consumption is less than the first threshold level and the predicted compression ratio is equal to or greater than the second threshold level, the control unit 14 determines to compress the uncompressed data and outputs compression mode information.

The operation of the control unit 14 described above is an example. In the present embodiment, the non-compression mode information or the compression mode information may be output based on the predicted power consumption and the predicted compression ratio.

The operation of the compression device 10 after the non-compression mode information or the compression mode information is output from the control unit 14 as described above is similar to that in the first embodiment described above, and thus detailed description thereof is omitted here.

In addition, the operation of the decompression device 20 in the present embodiment is similar to that in the first embodiment described above, and thus detailed description thereof is omitted here.

As described above, in the present embodiment, the compression ratio of compressing uncompressed data is predicted from the uncompressed data itself and non-compression mode information or compression mode information is output based on the predicted compression ratio in addition to the predicted power consumption in the first embodiment described above.

With such a configuration in the present embodiment, the compressor 11 (and the decompressor 21) can be controlled based on the predicted power consumption and the predicted compression ratio and more efficiently than when the compressor 11 is controlled based simply on the predicted power consumption.

The example in which the compression ratio is predicted based on the primary entropy was described in the present embodiment. Alternatively, the compression ratio may be predicted using a prediction model generated as a result of regression analysis such as the regression analysis described in the first embodiment. Such a prediction model can be generated using, for example, the first index $PE_1$ and the first index $PE_2$ described above. Specifically, a prediction model for predicting the compression ratio may be generated by calculating a correlation coefficient or the like using regression analysis on a large data set including the first index $PE_1$, the first index $PE_2$, and a compression ratio measured by simulation.

Further, the compressor 11 in the present embodiment is controlled based on both the predicted power consumption and the predicted compression ratio. It is noted that even if the compressor 11 is controlled based only on the predicted compression ratio (that is, the result of analysis by the analysis unit 13), the power consumption of the compression and decompression device 2e (compression device 10) in the present embodiment can be reduced.

Third Embodiment

Next, a third embodiment will be described. A memory system according to the third embodiment is similar in hardware configuration to the memory system according to the first embodiment described above, and thus the third embodiment will be described with reference to FIG. 1 for convenience.

The present embodiment is different from the first embodiment described above in that the compressor is controlled based on the cumulative value of the predicted power consumption (that is, switching occurs between non-compression and compression with respect to uncompressed data).

Figure 8:
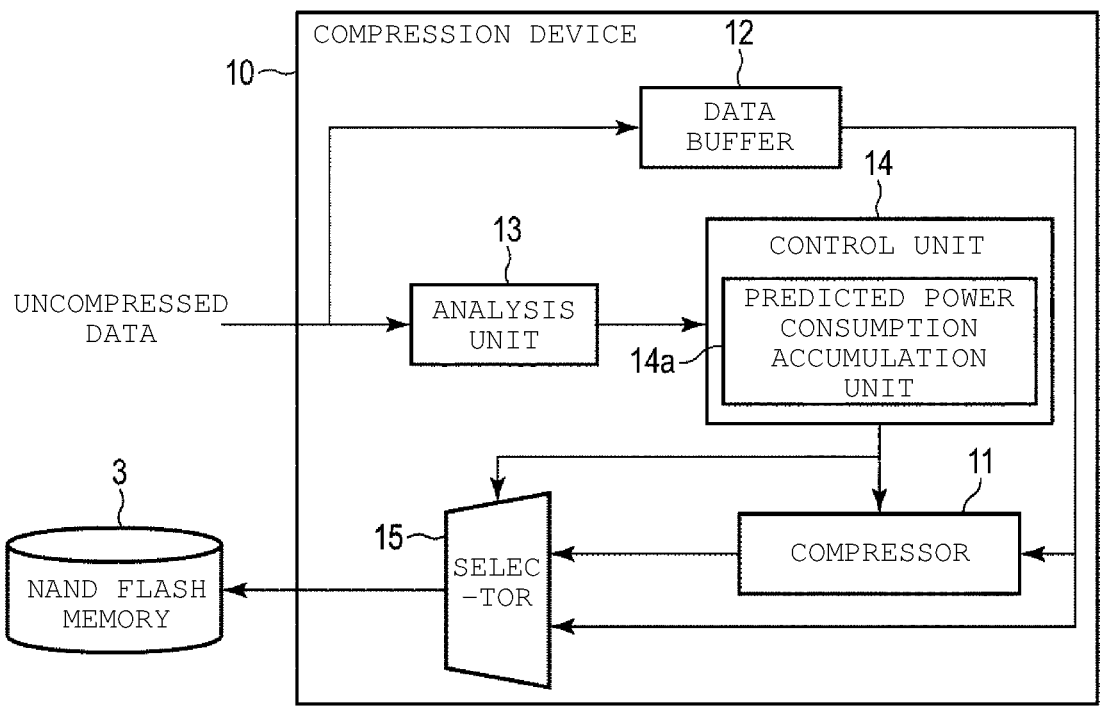
FIG. 8 is a diagram illustrating an example of a configuration of a compression device according to a third embodiment.

First, an example of a configuration of the compression device 10 according to the present embodiment will be described with reference to FIG. 8. In FIG. 8, the same reference numerals are given to elements similar to those of the compression device 10 illustrated in FIG. 2 and described above with the detailed description thereof omitted. Here, differences from the compression device 10 illustrated in FIG. 2 will be mainly described. The decompression device 20 according to the present embodiment is similar in configuration to the decompression device 20 according to the first embodiment described above, and thus the decompression device 20 according to the present embodiment is not illustrated in FIG. 8.

The compression device 10 includes the control unit 14 as in the first embodiment described above. The control unit 14 in the present embodiment includes a predicted power consumption accumulation unit 14*a* as illustrated in FIG. 8.

A sequence of uncompressed data, which is a unit of compression, is input to the compression device 10. The predicted power consumption accumulation unit 14*a* has a buffer and the cumulative value of the total value of the power consumption of the compressor 11 and the power consumption of the decompressor 21 output from the analysis unit 13 (that is, predicted power consumption) is stored in the buffer for each unit of the uncompressed data.

The control unit 14 controls the compressor 11 based on the predicted power consumption as described in the first embodiment and controls the compressor 11 based on the cumulative value of the predicted power consumption stored in the buffer of the predicted power consumption accumulation unit 14*a*.

Next, the operation of the compression device 10 at a time when a write command is issued by the host in the present embodiment will be described.

When the write command is issued by the host, uncompressed data (write data) specified in the write command is input to the compression device 10.

In this case, the uncompressed data input to the compression device 10 is stored in the data buffer 12 and input to the analysis unit 13.

Next, the analysis unit 13 predicts the power consumption of the compressor 11 from the uncompressed data using the first prediction model and predicts the power consumption of the decompressor 21 from the uncompressed data using the second prediction model. The processing of the analysis unit 13 predicting the power consumption of the compressor 11 and the power consumption of the decompressor 21 is similar to that of the first embodiment described above, and thus detailed description thereof is omitted here. The power consumption of the compressor 11 and the power consumption of the decompressor 21 predicted by the analysis unit 13 are output to the control unit 14.

Here, the predicted power consumption accumulation unit 14*a* in the control unit 14 has a buffer and the buffer stores the cumulative value of the power consumption predicted based on the past uncompressed data until the above uncompressed data is input to the compression device 10 (that is, predicted power consumption). The predicted power consumption accumulation unit 14*a* updates the cumulative value of the predicted power consumption by adding the predicted power consumption to the cumulative value of the predicted power consumption stored in the buffer.

Next, the control unit 14 compares the predicted power consumption to a first threshold level that is stored in the control unit 14. The predicted power consumption is the total value of the power consumption of the compressor 11 and the power consumption of the decompressor 21 output from the analysis unit 13 (that is, predicted power consumption).

In addition, the control unit 14 stores a threshold level (hereinafter, referred to as a third threshold level) to be compared to the cumulative value of the predicted power consumption updated by the predicted power consumption accumulation unit 14*a* and compares the cumulative value of the predicted power consumption to the third threshold level.

The control unit 14 controls the compressor 11 based on the result of comparison between the predicted power consumption and the first threshold level and the result of comparison between the cumulative value of the predicted power consumption and the third threshold level (that is, switches between non-compression and compression with respect to the uncompressed data).

Specifically, when, for example, the predicted power consumption is equal to or greater than the first threshold level and the cumulative value of the predicted power consumption is equal to or greater than the third threshold level, the control unit 14 outputs non-compression mode information indicating that the operation of the compressor 11 is stopped (that is, the uncompressed data is not compressed) to the compressor 11 and the selector 15. When the predicted power consumption is equal to or greater than the first threshold level and the cumulative value of the predicted power consumption is less than the third threshold level, the control unit 14 similarly outputs non-compression mode information to the compressor 11 and the selector 15. When the predicted power consumption is less than the first threshold level and the cumulative value of the predicted power consumption is equal to or greater than the third threshold level, the control unit 14 similarly outputs non-compression mode information to the compressor 11 and the selector 15. When the predicted power consumption is less than the first threshold level and the cumulative value of the predicted power consumption is less than the third threshold level, the control unit 14 outputs compression mode information indicating that the compressor 11 is operated (that is, the uncompressed data is compressed) to the compressor 11 and the selector 15.

According to this determination, control for stopping the operation of the compressor 11 can be performed in, for example, a case where the individual predicted power consumption is less than the first threshold level and yet the cumulative value of the predicted power consumption is equal to or greater than the third threshold level or a case where the cumulative value of the predicted power consumption is less than the third threshold level and yet specific predicted power consumption is equal to or greater than the first threshold level.

The cumulative value of the predicted power consumption stored in the buffer of the predicted power consumption accumulation unit 14*a* described above is reset after, for example, passage of a certain period of time or the addition (accumulation) of predicted power consumption regarding a certain number of uncompressed data. According to this operation, it is possible to avoid a situation in which the operation of the compressor 11 is continuously stopped after the cumulative value of the predicted power consumption becomes equal to or greater than the third threshold level.

The operation of the compression device 10 after the non-compression mode information or the compression mode information is output from the control unit 14 as described above is similar to that in the first embodiment described above, and thus detailed description thereof is omitted here.

In addition, the operation of the decompression device 20 in the present embodiment is similar to that in the first embodiment described above, and thus detailed description thereof is omitted here.

As described above, when a plurality of uncompressed data are sequentially input to the compression device 10 in the present embodiment, the power consumption of the compressor 11 and the power consumption of the decompressor 21 are predicted for each of the uncompressed data. Then, non-compression mode information or compression mode information is output (that is, the compressor 11 is controlled) based on the cumulative value of the power consumption of the compressor 11 and the power consumption of the decompressor 21 predicted for each of the uncompressed data (that is, predicted power consumption).

With such a configuration in the present embodiment, control for stopping the operation of the compressor 11 can be performed even when the power consumption for a certain period of time as well as a temporary power consumption is large.

In the present embodiment, the compressor 11 is controlled based on both the predicted power consumption and the cumulative value of the predicted power consumption. In another configuration as an example, the compressor 11 can be controlled based only on the cumulative value of the predicted power consumption.

In addition, in a configuration in which, for example, the compressor 11 is controlled based only on the cumulative value of the predicted power consumption, a plurality of uncompressed data are, for example, stored in the data buffer 12 and switching between non-compression and compression regarding the plurality of uncompressed data may be performed at once based on the cumulative value of power consumption predicted from each of the plurality of uncompressed data.

In the present embodiment, the cumulative value of the predicted power consumption is reset after, for example, passage of a certain period of time. In an alternative example, a buffer storing the predicted power consumption may be prepared for each uncompressed data and the predicted power consumption stored in the buffer may be reset after passage of a certain period of time. In such a configuration, the reset is per power consumption predicted from uncompressed data, and thus it is always possible to control the compressor 11 based on, for example, the cumulative value of the power consumption predicted from a predetermined number of the latest uncompressed data.

In the present embodiment, the cumulative value of the total value of the power consumption of the compressor 11 and the power consumption of the decompressor 21 is used. In an alternative configuration, the cumulative value of the power consumption of the compressor 11 may be used alone.

In the present embodiment, the compressor 11 in the present embodiment is controlled based on the cumulative value of the predicted power consumption in addition to the predicted power consumption that is taken into account in the configuration described in the first embodiment. Alternatively, the present embodiment may be combined with the second embodiment described above.

Fourth Embodiment

Next, a fourth embodiment will be described. a memory system according to the fourth embodiment is similar in hardware configuration to the memory system according to the first embodiment described above, and thus the fourth embodiment will be described with reference to FIG. 1 for convenience.

The present embodiment is different from the first embodiment and so on in that the compressor is partially controlled in accordance with mode information output from the control unit 14.

Figure 9:
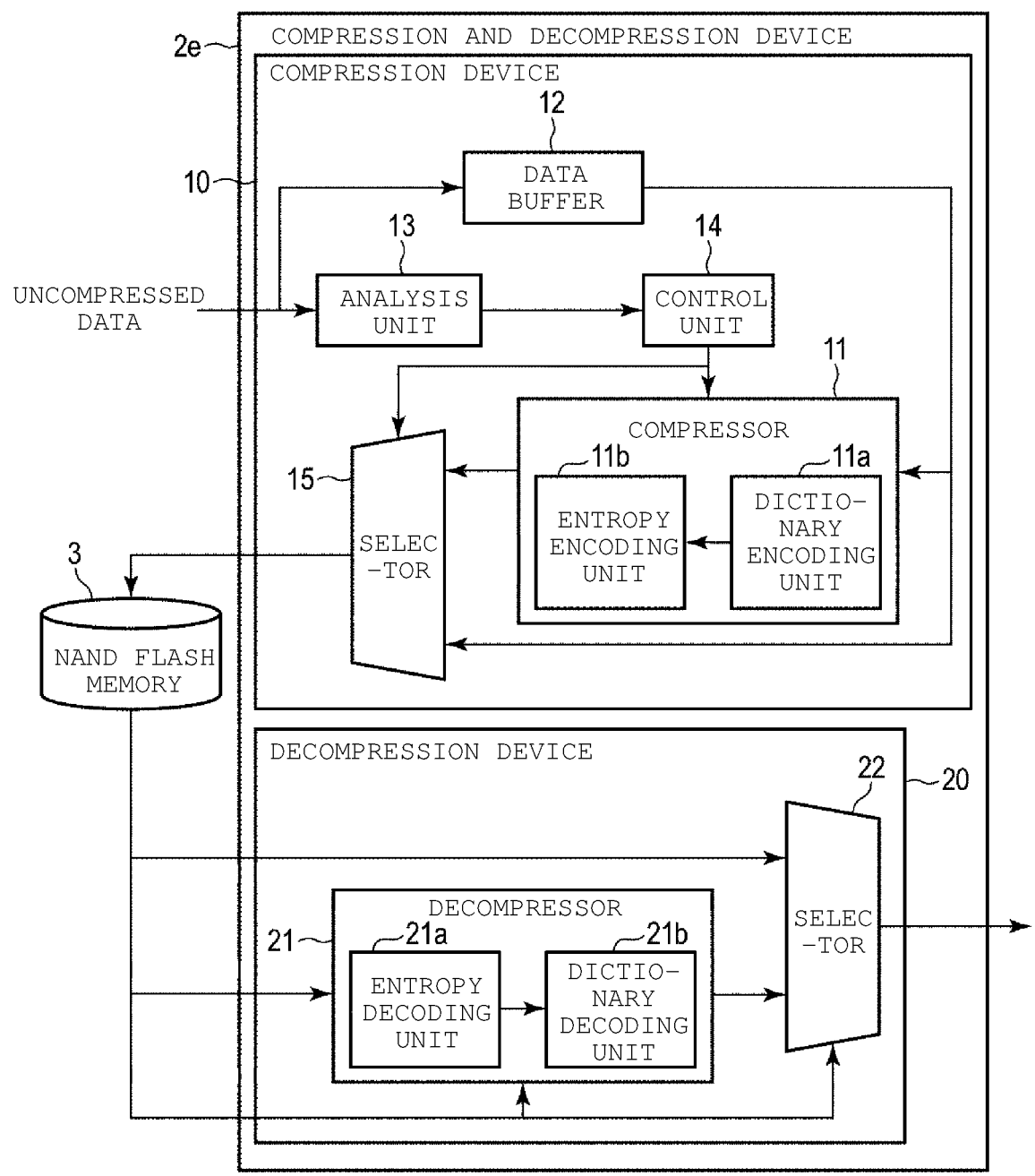
FIG. 9 is a diagram illustrating an example of a configuration of a compression and decompression device according to a fourth embodiment.

First, an example of a configuration of the compression and decompression device 2e according to the present embodiment will be described with reference to FIG. 9. In FIG. 9, the same reference numerals are given to elements similar to those in FIG. 2 with the detailed description thereof omitted. Here, differences from FIG. 2 will be mainly described.

The compression device 10 includes the compressor 11 as in the first embodiment described above. The compressor 11 in the present embodiment includes a plurality of processing units (first and second processing units).

The first processing unit compresses data by a first compression method. In the example illustrated in FIG. 9, the first processing unit is the dictionary encoding unit 11a performing dictionary encoding. The dictionary encoding unit 11a is as described above, and thus detailed description thereof is omitted here.

The second processing unit compresses data by a second compression method. In the example illustrated in FIG. 9, the second processing unit is the entropy encoding unit 11b performing entropy encoding. The entropy encoding unit 11b is as described above, and thus detailed description thereof is omitted here.

Two processing units (dictionary encoding unit 11a and entropy encoding unit 11b) are illustrated in FIG. 9. The compressor 11 may include three or more processing units.

The control unit 14 in the present embodiment outputs mode information (non-compression mode information or compression mode information) based on predicted power consumption as described in the first embodiment. The compression mode information in the present embodiment is information indicating that at least one of the dictionary encoding unit 11a and the entropy encoding unit 11b in the compressor 11 is operated. The non-compression mode information in the present embodiment is information indicating that the operation of both the dictionary encoding unit 11a and the entropy encoding unit 11b in the compressor 11 (that is, all of the plurality of processing units) is stopped.

The compressor 11 in the present embodiment is controlled based on the mode information output from the control unit 14 described above.

When the compressor 11 includes the plurality of processing units as described above, the decompressor 21 in the decompression device 20 in the present embodiment includes a plurality of processing units corresponding to the plurality of processing units, respectively.

In other words, when the compressor 11 includes the first processing unit compressing data by the first compression method and the second processing unit compressing data by the second compression method, the decompressor 21 includes a third processing unit decompressing the data compressed by the second compression method and a fourth processing unit decompressing the data compressed by the first compression method.

Specifically, when the compressor 11 includes the dictionary encoding unit 11a and the entropy encoding unit 11b as illustrated in FIG. 9, the decompressor 21 includes the entropy decoding unit 21a (third processing unit) that decodes data entropically encoded by the entropy encoding unit 11b and the dictionary decoding unit 21b (fourth processing unit) that decodes data dictionary-encoded by the dictionary encoding unit 11a.

Next, the processing of the compression and decompression device 2e at a time when a write command and a read command are issued by the host in the present embodiment will be described.

First, a case where the write command is issued by the host will be described. In this case, uncompressed data (write data) specified in the write command issued by the host is input to the compression device 10.

The uncompressed data input to the compression device 10 is stored in the data buffer 12 and input to the analysis unit 13.

Next, the analysis unit 13 predicts the power consumption of the compressor 11 from the uncompressed data using the first prediction model and predicts the power consumption of the decompressor 21 from the uncompressed data using the second prediction model. The processing of the analysis unit 13 predicting the power consumption of the compressor 11 and the power consumption of the decompressor 21 is similar to that of the first embodiment described above, and thus detailed description thereof is omitted here. The power consumption of the compressor 11 and the power consumption of the decompressor 21 predicted by the analysis unit 13 are output to the control unit 14.

The control unit 14 controls (the dictionary encoding unit 11a and the entropy encoding unit 11b in) the compressor 11 based on the power consumption of the compressor 11 and the power consumption of the decompressor 21 output from the analysis unit 13.

In the first embodiment described above, the control unit 14 outputs the non-compression mode information indicating that the operation of the entire compressor 11 is stopped when, for example, the predicted power consumption (the total value of the power consumption of the compressor 11 and the power consumption of the decompressor 21) is equal to or greater than the threshold level. Further, the control unit 14 outputs the compression mode information indicating that the entire compressor 11 is operated when the predicted power consumption is less than the threshold level. Meanwhile, in the present embodiment, the dictionary encoding unit 11a and the entropy encoding unit 11b in the compressor 11 are individually controlled.

Specifically, it is assumed that the control unit 14 stores, for example, a fourth threshold level and a fifth threshold level lower in value than the fourth threshold level.

In this case, the control unit 14 in the present embodiment outputs non-compression mode information indicating that the operation of both the dictionary encoding unit 11a and the entropy encoding unit 11b in the compressor 11 is stopped when, for example, the predicted power consumption is equal to or greater than the fourth threshold level.

In addition, when the predicted power consumption is less than the fifth threshold level, the control unit 14 outputs compression mode information indicating that both the dictionary encoding unit 11a and the entropy encoding unit 11b in the compressor 11 are operated (hereinafter, referred to as first compression mode information).

When the predicted power consumption is less than the fourth threshold level and is equal to or greater than the fifth threshold level, the control unit 14 outputs compression mode information indicating that only one of the dictionary encoding unit 11a and the entropy encoding unit 11b in the compressor 11 is operated (that is, the operation of only one of the dictionary encoding unit 11a and the entropy encoding unit 11b in the compressor 11 is stopped) (hereinafter, referred to as second compression mode information). In this case, control can be implemented such that, for example, the power consumption of the compression and decompression device 2e (compressor 11) is reduced by not performing entropy encoding and the amount of data written to the NAND flash memory 3 is reduced by performing dictionary encoding. In other words, when the second compression mode information is output from the control unit 14, power consumption reduction and data amount reduction can be achieved at the same time although the effect of power consumption reduction is lower than when the non-compression mode information is output and the effect of reducing the amount of data written to the NAND flash memory 3 is lower than when the first compression mode information is output. Which of the dictionary encoding unit 11a and the entropy encoding unit 11b should be operated when the predicted power consumption is less than the fourth threshold level and is equal to or greater than the fifth threshold level may be determined in advance. Alternatively, the decision may be dynamically made in accordance with the predicted power consumption or the like.

When non-compression mode information is output from the control unit 14 as described above, uncompressed data to which the non-compression mode information is added is written to the NAND flash memory 3 via the selector 15. When first or second compression mode information is output from the control unit 14, compressed data to which the first or second compression mode information is added (compressed data output from the compressor 11) is written to the NAND flash memory 3 via the selector 15.

Next, a case where the read command is issued by the host will be described. In this case, read data is read from the NAND flash memory 3 based on the read command issued by the host and the read data is input to the decompression device 20.

Here, non-compression mode information, first compression mode information, or second compression mode information is added to the read data input to the decompression device 20. In the decompression device 20, operation corresponding to the compression device 10 is performed based on the non-compression mode information, the first compression mode information, or the second compression mode information.

Specifically, when non-compression mode information is added to the read data input to the decompression device 20, the read data is uncompressed data, and thus the operation of the decompressor 21 is stopped and the uncompressed data is output via the selector 22.

When first compression mode information is added to the read data input to the decompression device 20, the read data is compressed data output from the compressor 11 by both the dictionary encoding unit 11a and the entropy encoding unit 11b in the compressor 11 being operated. Thus, uncompressed data output from the decompressor 21 by both the entropy decoding unit 21a and the dictionary decoding unit 21b in the decompressor 21 being operated (that is, uncompressed data decompressed from the compressed data) is output via the selector 22.

When second compression mode information is added to the read data input to the decompression device 20, the read data is compressed data output from the compressor 11 by one of the dictionary encoding unit 11a and the entropy encoding unit 11b in the compressor 11 being operated. Thus, uncompressed data output from the decompressor 21 by one of the entropy decoding unit 21a and the dictionary decoding unit 21b in the decompressor 21 being operated (that is, uncompressed data decompressed from the compressed data) is output via the selector 22. When only the dictionary encoding unit 11a operates in the compressor 11, the dictionary decoding unit 21b corresponding to the dictionary encoding unit 11a operates in the decompressor 21 as well. When only the entropy encoding unit 11b operates in the compressor 11, only the entropy decoding unit 21a corresponding to the entropy encoding unit 11b operates in the decompressor 21 as well.

As described above, in the present embodiment, the compressor 11 includes the first processing unit compressing data by the first compression method (for example, the dictionary encoding unit 11a) and the second processing unit compressing data by the second compression method (for example, the entropy encoding unit 11b). The compression mode information in the present embodiment is information indicating that at least one of the first processing unit and the second processing unit is operated.

The decompressor 21 in the present embodiment includes the third processing unit decompressing (decoding) the data compressed by the second compression method (for example, the entropy decoding unit 21a) and the fourth processing unit decompressing (decoding) the data compressed by the first compression method (for example, the dictionary decoding unit 21b). When read data (uncompressed data) to which non-compression mode information is added is input, the decompression device 20 stops the operation of the decompressor 21 (third and fourth processing units) based on the non-compression mode information and outputs the uncompressed data. When read data (compressed data) to which compression mode information is added is input, the decompression device 20 operates at least one of the third processing unit and the fourth processing unit based on the compression mode information and outputs uncompressed data decompressed (decoded) from the compressed data.

With the above configuration in the present embodiment, the operation of the compressor 11 and the decompressor 21 can be finely controlled (set) in part as compared with the first embodiment described above. Accordingly, it is possible to perform, for example, operation for compressing uncompressed data while reducing power consumption.

In the present embodiment, power consumption is reduced by, for example, stopping the operation of at least one of the dictionary encoding unit 11a (first processing unit) and the entropy encoding unit 11b (second processing unit) in the compressor 11. In another case as an example, the power consumption of the compression and decompression device 2e (compressor 11) can be reduced by changing a parameter for controlling the operation of the dictionary encoding unit 11a or the entropy encoding unit 11b.

Specifically, in dictionary encoding, processing for searching a history buffer for past data matching data partially cut out from uncompressed data is executed as described above. By narrowing the range of such history buffer-related search, the amount of processing in the dictionary encoding can be reduced and the power consumption of the compression and decompression device 2e (compressor 11) can be reduced.

To achieve such an objective, the compression mode information in the present embodiment may be, for example, information including a parameter for controlling the operation of at least one of the dictionary encoding unit 11a and the entropy encoding unit 11b. It is assumed that the parameter in the compression mode information is, for example, a parameter specifying the range of the history buffer-related search in the dictionary encoding. The parameter may be one limiting the processing executed by the dictionary encoding unit 11a and the entropy encoding unit 11b so that the power consumption of the compression and decompression device 2e is reduced. In this case, the decompression device 20 (decompressor 21) may operate so as to perform operation corresponding to the compression device 10 (compressor 11) in accordance with the parameter in the compression mode information added to read data (that is, control the operation of at least one of the entropy decoding unit 21a and the dictionary decoding unit 21b).

The compressor 11 in the present embodiment is controlled based on the total value of the power consumption of the compressor 11 and the power consumption of the decompressor 21 (predicted power consumption). When the analysis unit 13 predicts the power consumption of the dictionary encoding unit 11a in the compressor 11, the power consumption of the entropy encoding unit 11b in the compressor 11, the power consumption of the entropy decoding unit 21a in the decompressor 21, and the power consumption of the dictionary decoding unit 21b in the decompressor 21, the dictionary encoding unit 11a and the entropy encoding unit 11b may be controlled based on, for example, the total value of the power consumption of the dictionary encoding unit 11a and the power consumption of the dictionary decoding unit 21b and the total value of the power consumption of the entropy encoding unit 11b and the power consumption of the entropy decoding unit 21a, respectively.

The power consumption of the dictionary encoding unit 11a in the compressor 11 can be predicted based on, for example, the first index $PE_1$ described above. The power consumption of the entropy encoding unit 11b in the compressor 11 can be predicted based on, for example, the first index $PE_2$ described above. The power consumption of the entropy decoding unit 21a in the decompressor 21 can be predicted based on, for example, the second index $PD_1$ described above. The power consumption of the dictionary decoding unit 21b in the decompressor 21 can be predicted based on, for example, the second index $PD_2$ described above.

The compressor 11 (and the decompressor 21) in the present embodiment is partially controlled in the configuration described in the first embodiment. Alternatively, the present embodiment may be combined with the second or third embodiment described above.

Fifth Embodiment

Next, a fifth embodiment will be described. A memory system according to the fifth embodiment is similar in hardware configuration to the memory system according to the first embodiment described above, and thus the fifth embodiment will be described with reference to FIG. 1 for convenience.

The present embodiment is different from the first embodiment and so on in that a plurality of compressors are controlled in accordance with mode information output from the control unit.

Figure 10:
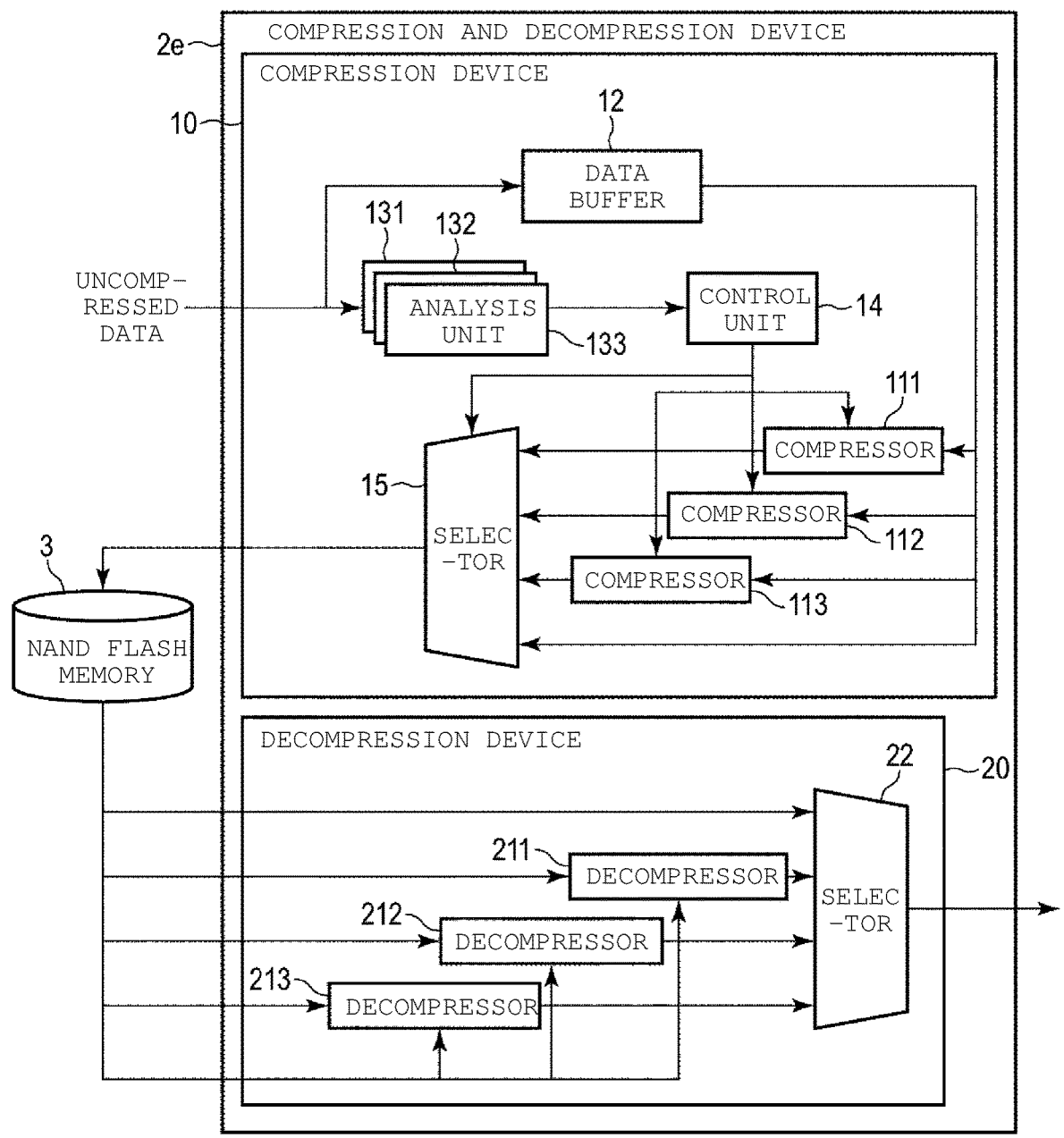
FIG. 10 is a diagram illustrating an example of a configuration of a compression and decompression device according to a fifth embodiment.

First, an example of a configuration of the compression and decompression device 2e according to the present embodiment will be described with reference to FIG. 10. In FIG. 10, the same reference numerals are given to elements similar to those in FIG. 2 with the detailed description thereof omitted. Here, differences from FIG. 2 will be mainly described.

In the present embodiment, the compression device 10 includes a plurality of compressors 111 to 113. It is assumed that the plurality of compressors 111 to 113 are capable of compressing data using different compression algorithms. Specifically, when, for example, the compressor 111 is a compressor employing a compression algorithm that is a combination of dictionary encoding and entropy encoding (hereinafter, referred to as a first compression algorithm), the compressor 112 is, for example, a compressor employing a compression algorithm based on run-length encoding (hereinafter, referred to as a second compression algorithm) and the compressor 113 is a compressor employing a compression algorithm other than the first and second compression algorithms. Examples of the compression algorithm other than the first and second compression algorithms include byte pair encoding (BPE) and prediction by partial matching (PPM).

The plurality of compressors 111 to 113 described here employ different compression algorithms. Alternatively, the plurality of compressors 111 to 113 may be compressors employing the same compression algorithm and different in terms of compression performance (e.g., power consumption).

Three compressors 111 to 113 are illustrated in FIG. 10 for convenience. The number of the compressors may be two or more.

When the compression device 10 includes the plurality of compressors 111 to 113 as described above, the decompression device 20 according to the present embodiment includes decompressors 211 to 213, which are equal in number to the compressors 111 to 113. In this case, the decompressor 211 is a decompressor decompressing compressed data compressed by the first compression algorithm employed in the compressor 111. The decompressor 212 is a decompressor decompressing compressed data compressed by the second compression algorithm employed in the compressor 112. The decompressor 213 is a decompressor decompressing compressed data compressed by a third compression algorithm employed in the compressor 113.

The analysis unit 13 in the first embodiment described above predicts the power consumption of one compressor 11 and the power consumption of one decompressor 21. Meanwhile, the compression device 10 in the present embodiment includes a plurality of analysis units 131 to 133 corresponding to the plurality of compressors 111 to 113 (and the plurality of decompressors 211 to 213).

The control unit 14 in the present embodiment outputs mode information (non-compression mode information or compression mode information) based on the power consumption predicted by the analysis units 131 to 133 described above. The compression mode information in the present embodiment is information indicating that, for example, one of the plurality of compressors 111 to 113 is operated. The non-compression mode information in the present embodiment is information indicating that the operations of the plurality of compressors 111 to 113 are stopped.

Next, the processing of the compression and decompression device 2e at a time when a write command and a read command are issued by the host in the present embodiment will be described.

First, a case where the write command is issued by the host will be described. In this case, uncompressed data (write data) specified in the write command issued by the host is input to the compression device 10.

The uncompressed data input to the compression device 10 is stored in the data buffer 12 and input to the plurality of analysis units 131 to 133.

In this case, the analysis unit 131 predicts the power consumption of the compressor 111 from the uncompressed data using the first prediction model and predicts the power consumption of the decompressor 211 from the uncompressed data using the second prediction model. In addition, the analysis unit 132 predicts the power consumption of the compressor 112 from the uncompressed data using the first prediction model and predicts the power consumption of the decompressor 212 from the uncompressed data using the second prediction model. Likewise, the analysis unit 133 predicts the power consumption of the compressor 113 from the uncompressed data using the first prediction model and predicts the power consumption of the decompressor 213 from the uncompressed data using the second prediction model. The processing of each of the plurality of analysis units 131 to 133 is similar to the processing of the analysis unit 13 described in the first embodiment, and thus detailed description thereof is omitted here. The power consumption of the plurality of compressors 111 to 113 and the power consumption of the plurality of decompressors 211 to 213 predicted by the plurality of analysis units 131 to 133 are output to the control unit 14.

The control unit 14 controls the plurality of compressors 111 to 113 based on the power consumption of the plurality of compressors 111 to 113 and the power consumption of the plurality of decompressors 211 to 213 output from the plurality of analysis units 131 to 133.

In the first embodiment described above, the control unit 14 outputs the non-compression mode information indicating that the operation of the compressor 11 is stopped when, for example, the predicted power consumption (the total value of the power consumption of the compressor 11 and the power consumption of the decompressor 21) is equal to or greater than the threshold level. Also, the control unit 14 outputs the compression mode information indicating that the compressor 11 is operated when the predicted power consumption is less than the threshold level. Meanwhile, in the present embodiment, each of the plurality of compressors 111 to 113 is individually controlled.

Specifically, it is assumed that the control unit 14 stores a threshold level for the compressor 111 (and the decompressor 211), a threshold level for the compressor 112 (and the decompressor 212), and a threshold level for the compressor 113 (and the decompressor 213).

In this case, the control unit 14 in the present embodiment outputs non-compression mode information indicating that the operations of the plurality of compressors 111 to 113 are stopped when the total value of the power consumption of the compressor 111 and the power consumption of the decompressor 211 (hereinafter, referred to as first predicted power consumption) is equal to or greater than the threshold level for the compressor 111, the total value of the power consumption of the compressor 112 and the power consumption of the decompressor 212 (hereinafter, referred to as second predicted power consumption) is equal to or greater than the threshold level for the compressor 112, and the total value of the power consumption of the compressor 113 and the power consumption of the decompressor 213 (hereinafter, referred to as third predicted power consumption) is equal to or greater than the threshold level for the compressor 113.

When the first predicted power consumption is less than the threshold level for the compressor 111, the control unit 14 outputs compression mode information indicating that the compressor 111 is operated (hereinafter, referred to as first compression mode information). When the second predicted power consumption is less than the threshold level for the compressor 112, the control unit 14 outputs compression mode information indicating that the compressor 112 is operated (hereinafter, referred to as second compression mode information). When the third predicted power consumption is less than the threshold level for the compressor 113, the control unit 14 outputs compression mode information indicating that the compressor 113 is operated (hereinafter, referred to as third compression mode information).

In the present embodiment, one of the plurality of compressors 111 to 113 is operated except for a case where the operations of the plurality of compressors 111 to 113 are stopped.

To achieve this objective, priorities are preset for the plurality of compressors 111 to 113 based on, for example, the viewpoint of compression algorithm (compression performance), power consumption, or the like.

According to the prioritization, the control unit 14 may output compression mode information indicating that the compressor having the highest priority among the plurality of compressors 111 to 113 is operated when, for example, the first predicted power consumption is less than the threshold level for the compressor 111, the second predicted power consumption is less than the threshold level for the compressor 112, and the third predicted power consumption is less than the threshold level for the compressor 113. Although a case where the three predicted power consumptions (first to third predicted power consumptions) are less than the threshold levels is described here, the same applies to a case where two predicted power consumptions are less than threshold levels.

The compressor to be operated when two or more predicted power consumptions are less than threshold levels may be dynamically determined (selected) based on information such as the type of uncompressed data.

In addition, the threshold levels for the compressors 111 to 113 described above may be equal or different in value.

When non-compression mode information is output from the control unit 14 as described above, uncompressed data to which the non-compression mode information is added is written to the NAND flash memory 3 via the selector 15.

When first compression mode information is output from the control unit 14, compressed data output from the compressor 111 operating based on the first compression mode information is written to the NAND flash memory 3 via the selector 15. In this case, the first compression mode information is added to the compressed data.

When second compression mode information is output from the control unit 14, compressed data output from the compressor 112 operating based on the second compression mode information is written to the NAND flash memory 3 via the selector 15. In this case, the second compression mode information is added to the compressed data.

When third compression mode information is output from the control unit 14, compressed data output from the compressor 113 operating based on the third compression mode information is written to the NAND flash memory 3 via the selector 15. In this case, the third compression mode information is added to the compressed data.

Next, a case where the read command is issued by the host will be described. In this case, read data is read from the NAND flash memory 3 based on the read command issued by the host and the read data is input to the decompression device 20.

Here, non-compression mode information, first compression mode information, second compression mode information, or third compression mode information is added to the read data input to the decompression device 20. In the decompression device 20, operation corresponding to the compression device 10 is performed based on the non-compression mode information, the first compression mode information, the second compression mode information, or the third compression mode information.

Specifically, when non-compression mode information is added to the read data input to the decompression device 20, the read data is uncompressed data, and thus the operation of the plurality of decompressors 211 to 213 is stopped and the uncompressed data is output via the selector 22.

When the first compression mode information is added to the read data input to the decompression device 20, the read data is compressed data output from the compressor 111. In this case, uncompressed data output from the decompressor 211 by the decompressor 211 being operated (the operation of the decompressors 212 and 213 being stopped) (that is, uncompressed data decompressed from the compressed data) is output via the selector 22.

When the second compression mode information is added to the read data input to the decompression device 20, the read data is compressed data output from the compressor 112. In this case, uncompressed data output from the decompressor 212 by the decompressor 212 being operated (the operation of the decompressors 211 and 213 being stopped) (that is, uncompressed data decompressed from the compressed data) is output via the selector 22.

When the third compression mode information is added to the read data input to the decompression device 20, the read data is compressed data output from the compressor 113. In this case, uncompressed data output from the decompressor 213 by the decompressor 213 being operated (the operation of the decompressors 211 and 212 being stopped) (that is, uncompressed data decompressed from the compressed data) is output via the selector 22.

As described above, in the present embodiment, the compression device 10 includes the plurality of compressors 111 to 113 and the decompression device 20 includes the plurality of decompressors 211 to 213. The plurality of analysis units 131 to 133 in the compression device 10 according to the present embodiment predict the power consumption of the plurality of compressors 111 to 113 and the power consumption of the plurality of decompressors 211 to 213. In addition, the control unit 14 in the compression device 10 according to the present embodiment outputs non-compression mode information or compression mode information based on a plurality of predicted power consumptions predicted for each set of the compressors 111 to 113 and the decompressors 211 to 213. The predicted power consumptions are, for example, the total value of the power consumption of the first compressor and the power consumption of the first decompressor and the total value of the power consumption of the second compressor and the power consumption of the second decompressor). Further, the non-compression mode information in the present embodiment is information indicating that the operations of the plurality of compressors are stopped, and the compression mode information in the present embodiment is information indicating that one of the plurality of compressors is operated.

When read data (uncompressed data) to which non-compression mode information is added is input, the decompression device 20 in the present embodiment stops the operation of the plurality of decompressors based on the non-compression mode information and outputs uncompressed data. When read data (compressed data) to which compression mode information is added is input, the decompression device 20 operates one of the plurality of decompressors based on the compression mode information and outputs uncompressed data decompressed from the compressed data.

In the present embodiment, it is possible to perform compression in accordance with a compression algorithm that is determined to be appropriate based on, for example, power consumption and reduce the power consumption of the compression device 10 even when uncompressed data is compressed by, for example, preparing the plurality of compressors 111 to 113 employing different compression algorithms as described above and performing power consumption prediction for each compression algorithm (that is, for each compressor 111 to 113).

The plurality of compressors 111 to 113 (and the plurality of decompressors 211 to 213) in the present embodiment are controlled in the configuration described in the first embodiment. Alternatively, the present embodiment may be combined with the second to fourth embodiments described above.

Sixth Embodiment

Next, a sixth embodiment will be described. a memory system according to the sixth embodiment is similar in hardware configuration to the memory system according to the first embodiment described above, and thus the sixth embodiment will be described with reference to FIG. 1 for convenience.

The present embodiment is different from the first embodiment and so on in that a threshold level compared to predicted power consumption for compressor control is adjusted based on external information.

Figure 11:
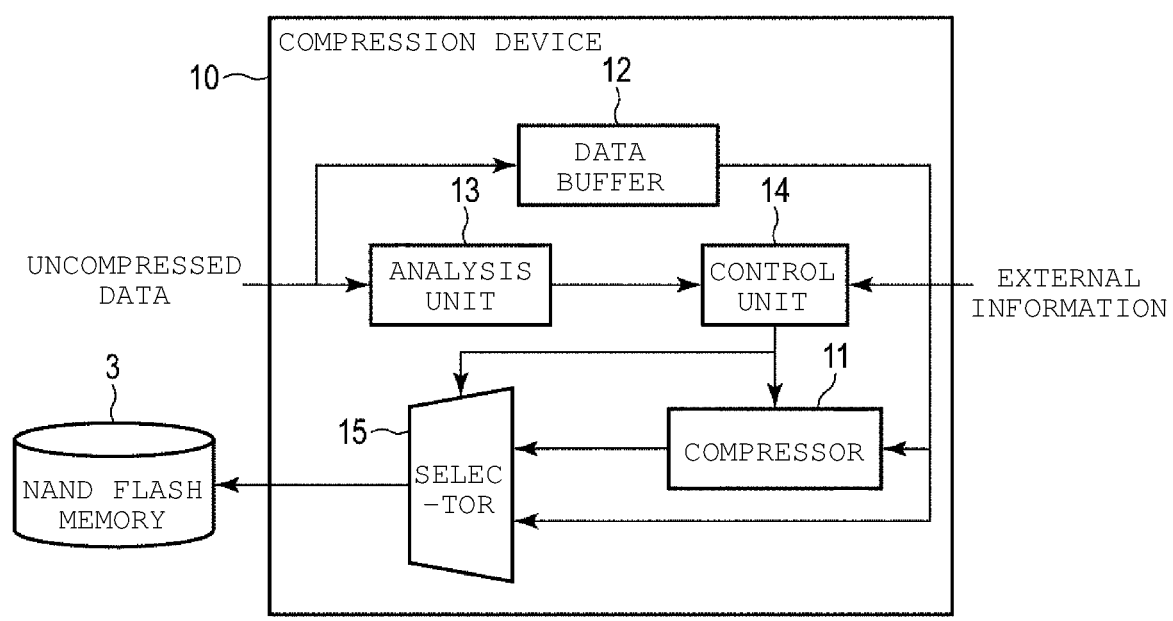
FIG. 11 is a diagram illustrating an example of a configuration of a compression device according to a sixth embodiment.

First, an example of a configuration of the compression device 10 according to the present embodiment will be described with reference to FIG. 11. In FIG. 11, the same reference numerals are given to elements similar to those of the compression device 10 illustrated in FIG. 2 and described above with the detailed description thereof omitted. Here, differences from the compression device 10 illustrated in FIG. 2 will be mainly described. The decompression device 20 according to the present embodiment is similar in configuration to the decompression device 20 according to the first embodiment described above, and thus the decompression device 20 according to the present embodiment is not illustrated in FIG. 11.

The compression device 10 includes the control unit 14 as in the first embodiment described above. The control unit 14 in the present embodiment receives external information related to, for example, the power consumption of the compression and decompression device 2e (hereinafter, referred to as external information) from the outside of the compression device 10.

The control unit 14 adjusts the threshold level compared to the above-described predicted power consumption based on the input external information. The control unit 14 controls the compressor 11 based on the result of comparison between the predicted power consumption and the adjusted threshold level.

Next, the operation of the compression device 10 at a time when a write command is issued by the host in the present embodiment will be described.

When the write command is issued by the host, uncompressed data (write data) specified in the write command is input to the compression device 10.

In this case, the uncompressed data input to the compression device 10 is stored in the data buffer 12 and input to the analysis unit 13.

Next, the analysis unit 13 predicts the power consumption of the compressor 11 from the uncompressed data using the first prediction model and predicts the power consumption of the decompressor 21 from the uncompressed data using the second prediction model. The processing of the analysis unit 13 predicting the power consumption of the compressor 11 and the power consumption of the decompressor 21 is similar to that of the first embodiment described above, and thus detailed description thereof is omitted here. The power consumption of the compressor 11 and the power consumption of the decompressor 21 predicted by the analysis unit 13 are output to the control unit 14.

When, for example, the entire circuit of the controller 2 (SSD controller) generates heat here, the memory system 1 transitions into a thermal slot state and a decline in the speed of data writing to the NAND flash memory 3 and a decline in the speed of data reading from the NAND flash memory 3 occur. In this case, the control unit 14 inputs target power consumption for the memory systems transitions out of the thermal slot state from the outside as external information and performs adjustment so as to lower the threshold level based on the target power consumption (or set the threshold level to the target power consumption).

According to this operation, the operation of the compressor 11 is stopped (that is, non-compression mode information is output) even when the predicted power consumption is smaller than usual. Accordingly, a contribution can be made to the elimination of the above-described thermal slot state.

Here, the threshold-lowering adjustment is performed based on the external information (target power consumption). When, for example, external information that indicates that it is relatively preferable to operate the compressor 11 is input, threshold-raising adjustment may be performed based on the external information.

Here, external information-based threshold adjustment was described. Alternatively, the total value of the power consumption of the compressor 11 and the power consumption of the decompressor 21 output from the analysis unit 13 (predicted power consumption) may be adjusted based on the external information.

The present embodiment and the first embodiment are similar to each other in that non-compression mode information is output when predicted power consumption is equal to or greater than a threshold level and compression mode information is output when the predicted power consumption is less than the threshold level.

The operation of the compression device 10 after the non-compression mode information or the compression mode information is output from the control unit 14 is similar to that in the first embodiment described above, and thus detailed description thereof is omitted here.

In addition, the operation of the decompression device 20 in the present embodiment is similar to that in the first embodiment described above, and thus detailed description thereof is omitted here.

As described above, in the present embodiment, threshold adjustment is performed based on external information input from the outside. As a result, the power consumption of the compression and decompression device 2e can be reduced based on information from the outside of the compression and decompression device 2e (for example, the memory system 1).

The external information in the present embodiment may be, for example, information instructing the operation of the compressor 11 to be stopped or the compressor 11 to be operated. In this case, the control unit 14 may output non-compression mode information or compression mode information in accordance with the external information.

The external information-based threshold adjustment in the present embodiment is performed in the configuration described in the first embodiment. Alternatively, the present embodiment may be combined with the second to fifth embodiments described above.

According to at least one embodiment described above, it is possible to provide a compression device, a compression and decompression device, and a memory system capable of reducing power consumption.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A compression device comprising:
   an analyzer circuit configured to analyze first data that is input thereto, determine an estimated power consumption in compressing and/or decompressing with respect to each of a sequence of the first data, and generate one or more parameter values regarding data compression and/or decompression, the one or more parameter values including a first parameter value, which is a cumulative value of the estimated power consumption in compressing and/or decompressing with respect to the sequence of the first data;
   a control circuit configured to generate at least one compression mode information indicating whether or not compression is to be performed, based on the one or more parameter values;
   a compressor circuit configured to compress the first data into second data according to the compression mode information; and
   a selector circuit configured to output the first data if not compressed or the second data if the first data is compressed, together with the compression mode information.

2. The compression device according to claim 1, wherein the one or more parameter values includes a second parameter value regarding power consumption in the data compression and/or decompression.

3. The compression device according to claim 2, wherein the control circuit is configured to compare the second parameter value with a first threshold value, and generate the compression mode information indicating that compression is to be performed when the second parameter value is less than the first threshold value and the compression mode information indicating that compression is not to be performed when the second parameter value is greater than the first threshold value.

4. The compression device according to claim 2, wherein the second parameter value is an estimated total power consumption in compressing the first data into the second data and decompressing the second data into the first data.

5. The compression device according to claim 4, wherein the analyzer circuit stores a first estimation model with which an estimated power consumption in compressing the first data into the second data is generated and a second estimation model with which an estimated power consumption in decompressing the second data into the first data is generated, the first estimation model including a first estimation parameter and the second estimation model including a second estimation parameter, and
   the analyzer circuit is configured to adjust the first and second estimation parameters based on an iteration of power consumption estimation simulations.

6. The compression device according to claim 1, wherein the one or more parameter values includes a third parameter value, which is a compression ratio of data compression.

7. The compression device according to claim 6, wherein the control circuit is configured to compare the third parameter value with a second threshold value, and generate the compression mode information indicating that compression is to be performed when the third parameter value is greater than the second threshold value and the compression mode information indicating that compression is not to be performed when the third parameter value is less than the second threshold value.

8. The compression device according to claim 1, wherein the control circuit is configured to compare each of the one or more parameter values with a corresponding threshold value, and generate the compression mode information based on a comparison result.

9. The compression device according to claim 8, wherein the control circuit is configured to adjust the corresponding threshold value based on external information that is input from a device external to the compression device.

10. The compression device according to claim 1, wherein the first data is non-compressed data.

11. A compression and decompression device comprising:
    the compression device according to claim 1; and
    a decompression device configured to receive output data, decompress the second data into the first data when the output data includes the second data and the compression mode information indicating that compression is to be performed, and not perform decompression when the output data includes the first data and the compression mode information indicating that compression is not to be performed.

12. The compression device according to claim 1, wherein the compressor circuit includes a first compressor configured to perform first compression and a second compressor configured to perform second compression different from the first compression,
    the compression mode information generated by the control circuit indicates at least one of whether or not to perform the first compression and whether or not to perform the second compression.

13. The compression device according to claim 12, wherein
    the first compressor compresses the first data into the second data with the first compression when the compression mode information indicates that the first compression is to be performed, and
    the second compressor compresses the second data into third data with the second compression when the compression mode information indicates that the second compression is to be performed.

14. The compression device according to claim 12, wherein one of the first and second compressions includes dictionary encoding and the other of the first and second compressions includes entropy encoding.

15. The compression device according to claim 12, wherein the analyzer circuit includes a first analyzer configured to generate one or more parameter values regarding data compression and/or decompression by the first compressor and a second analyzer configured to generate one or more parameter values regarding data compression and/or decompression by the second compressor.

16. A compression and decompression device comprising:
the compression device according to claim 12; and
a decompression device configured to receive output data, the decompression device including:
   a first decompressor configured to perform first decompression when the output data includes the compression mode information indicating that the first compression is to be performed; and
   a second decompressor configured to perform second decompression different from the first decompression, when the output data includes the compression mode information indicating that the second compression is to be performed.

17. A memory system comprising:
a non-volatile memory; and
a memory controller including a compression device, the compression device including:
   an analyzer circuit configured to analyze first data that is input thereto, determine an estimated power consumption in compressing and/or decompressing with respect to each of a sequence of the first data, and generate one or more parameter values regarding data compression and/or decompression, the one or more parameter values including a first parameter value, which is a cumulative value of the estimated power consumption in compressing and/or decompressing with respect to the sequence of the first data;
   a control circuit configured to generate at least one compression mode information indicating whether or not compression is to be performed, based on the one or more parameter values;
   a compressor circuit configured to compress the first data into second data according to the compression mode information; and
   a selector circuit configured to output write data including the first data if not compressed or the second data if the first data is compressed, together with the compression mode information,
wherein the memory controller stores the write data.

18. The memory system according to claim 17, wherein the memory controller is configured to read data from the non-volatile memory, the read data including the compression mode information indicating that compression is to be performed when the first data is included in the read data and including the compression mode information indicating that compression is not to be performed when the second data is included in the read data.

19. The memory system according to claim 18, wherein the memory controller further includes a decompression device configured to receive the read data, decompress the second data into the first data when the output data includes the second data, and not perform decompression when the output data includes the first data.

* * * * *